No. 875,659. PATENTED DEC. 31, 1907.
W. FEHR.
MACHINE FOR MANUFACTURING HEDDLES.
APPLICATION FILED DEC. 22, 1905.
17 SHEETS—SHEET 1.
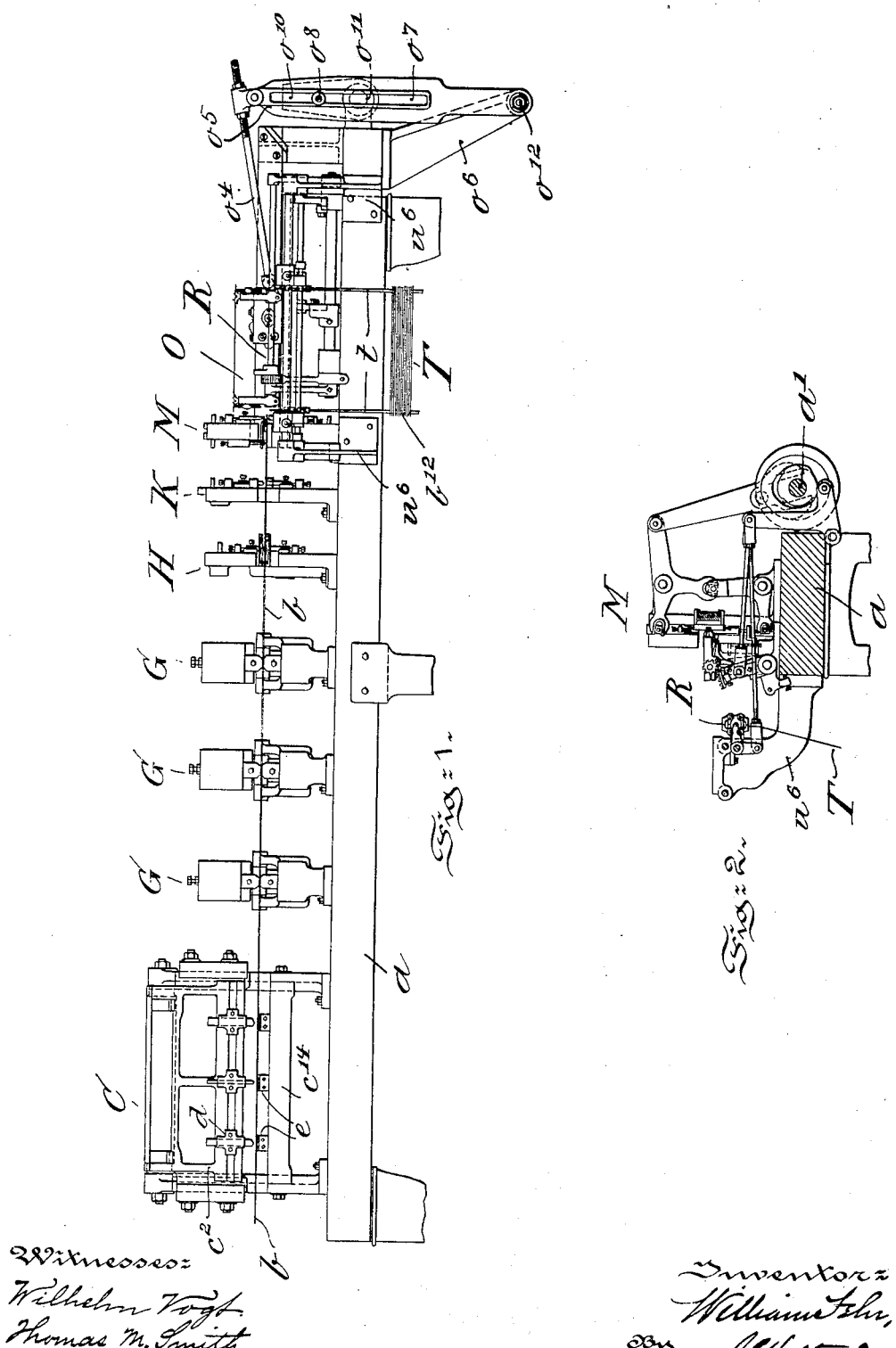

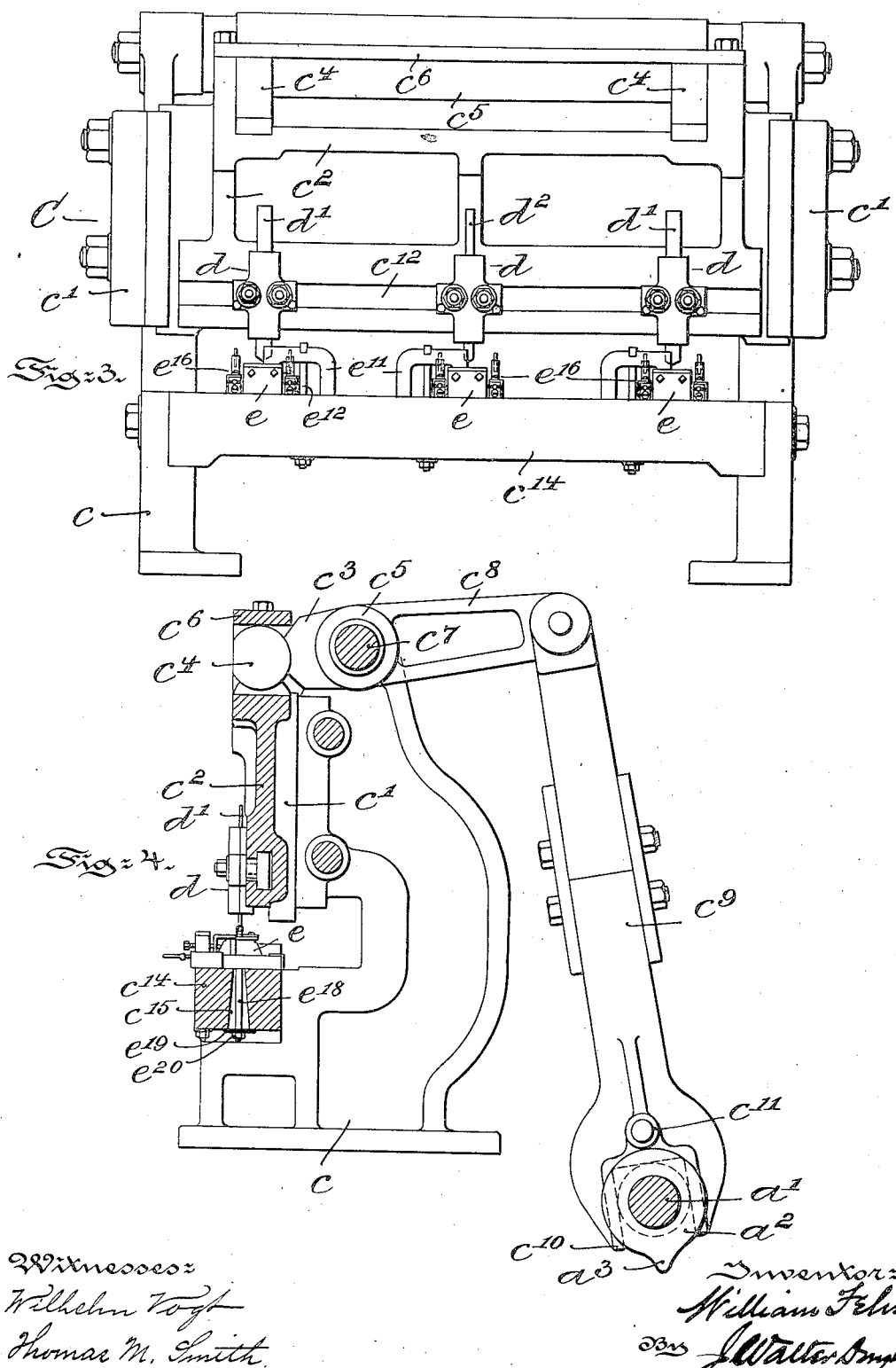

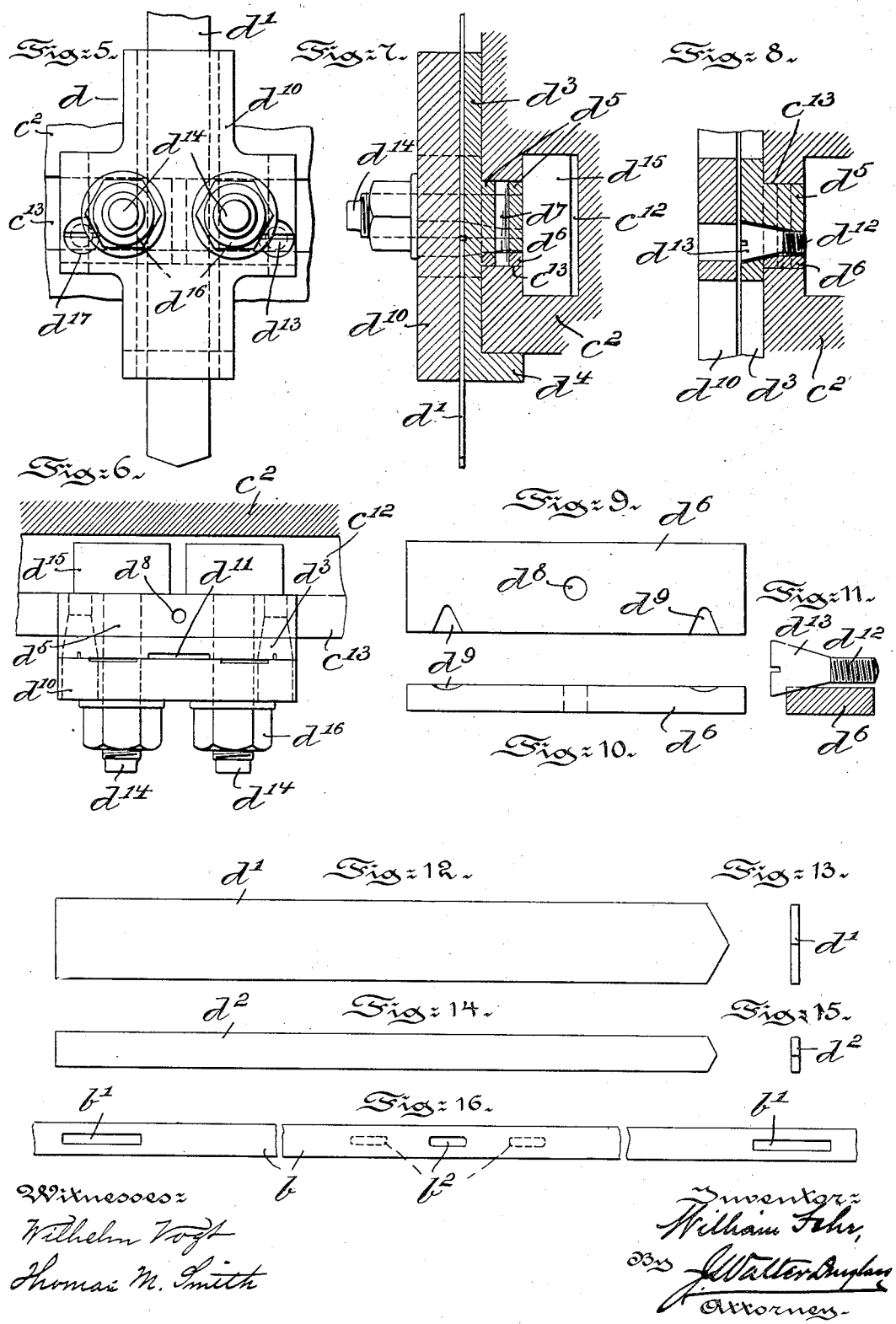

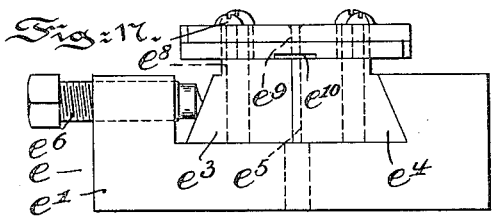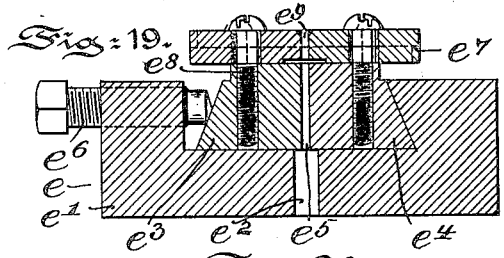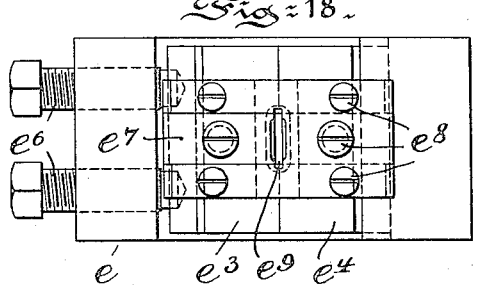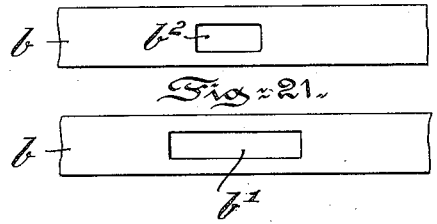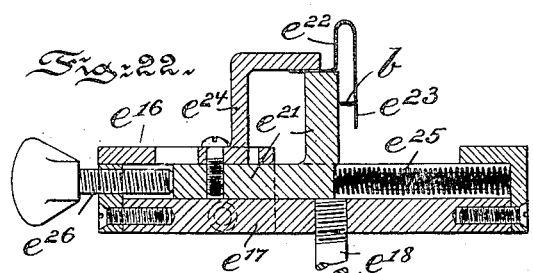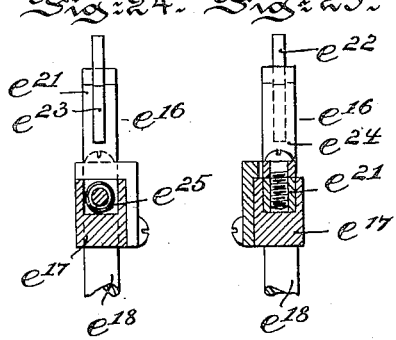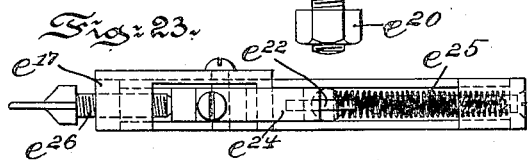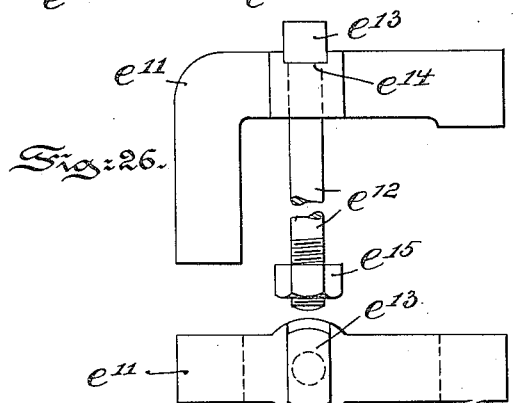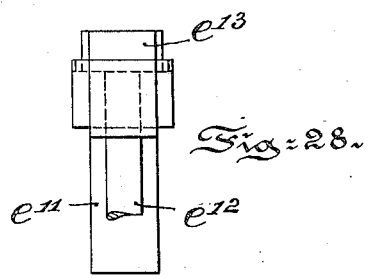

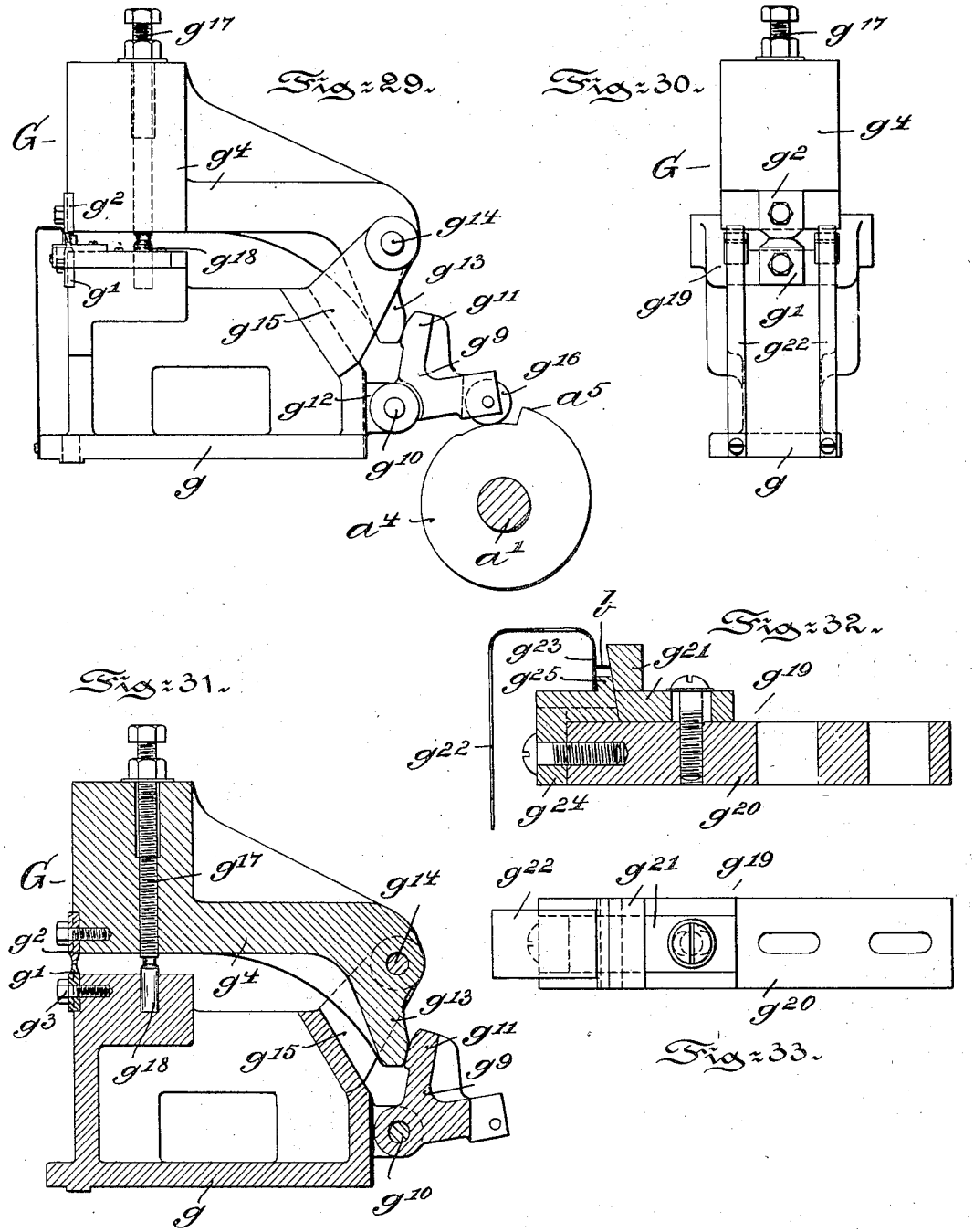

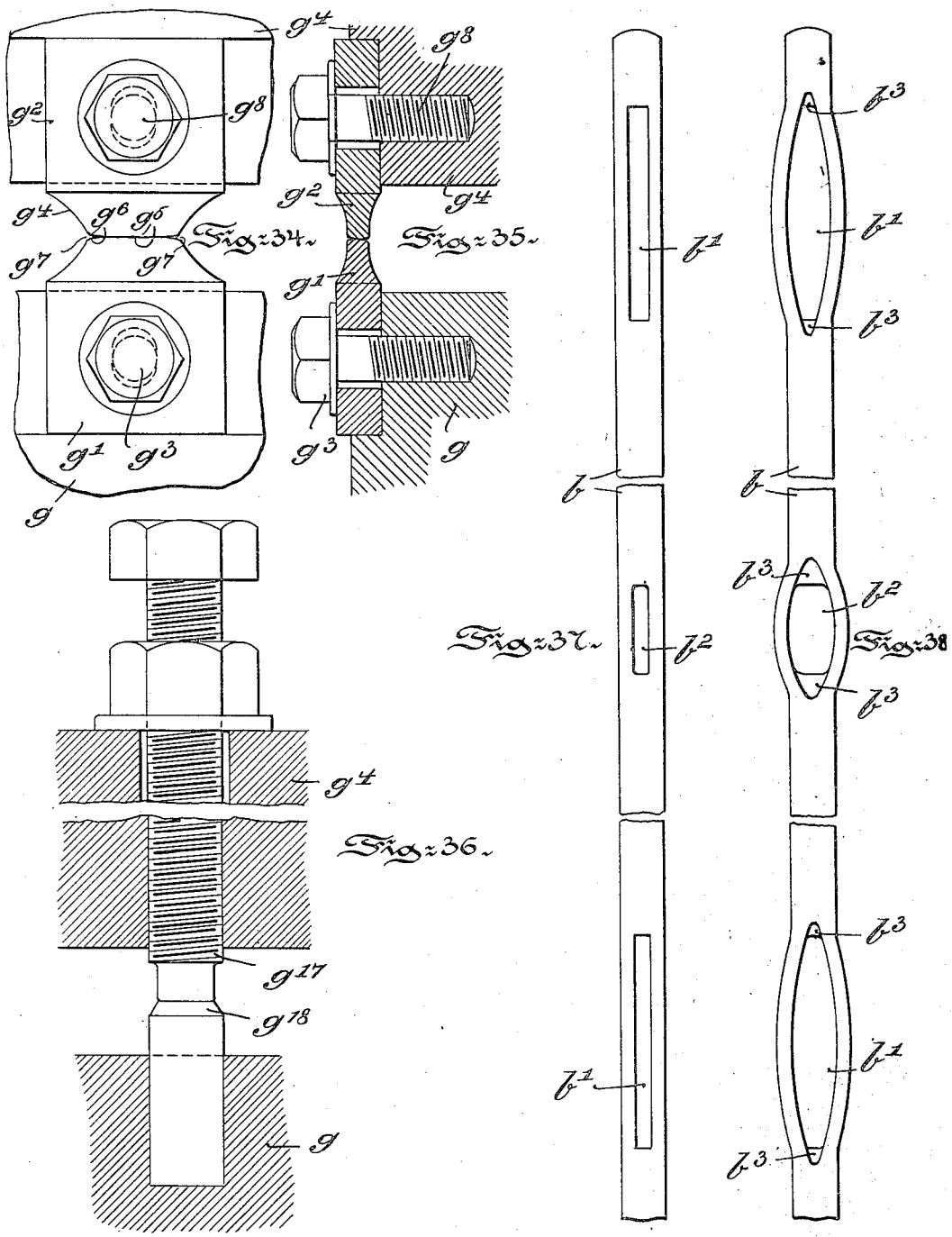

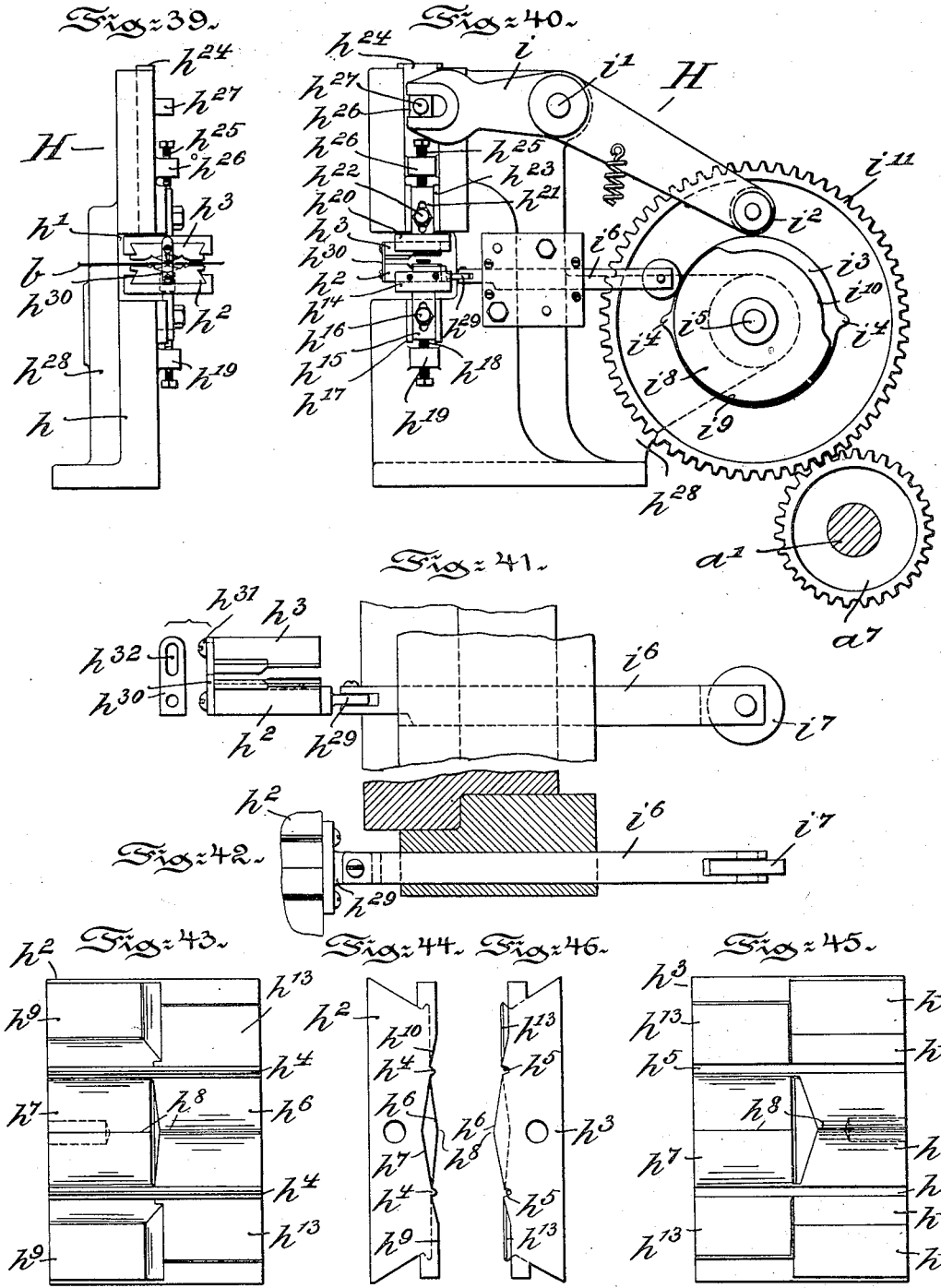

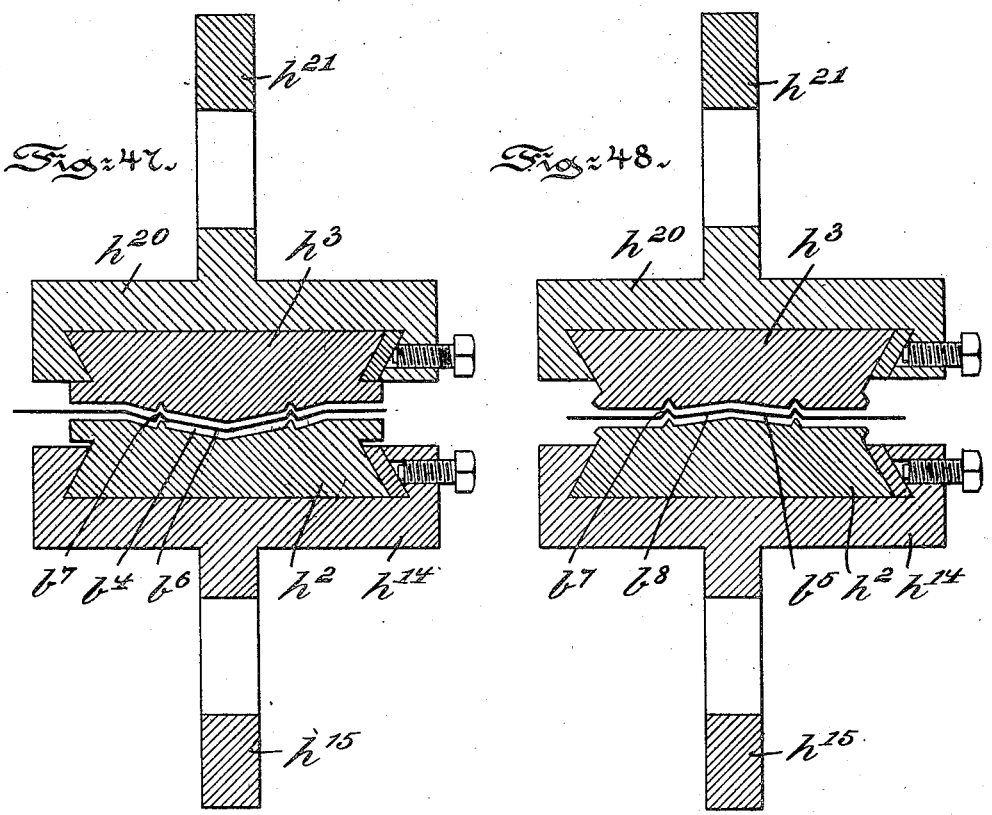

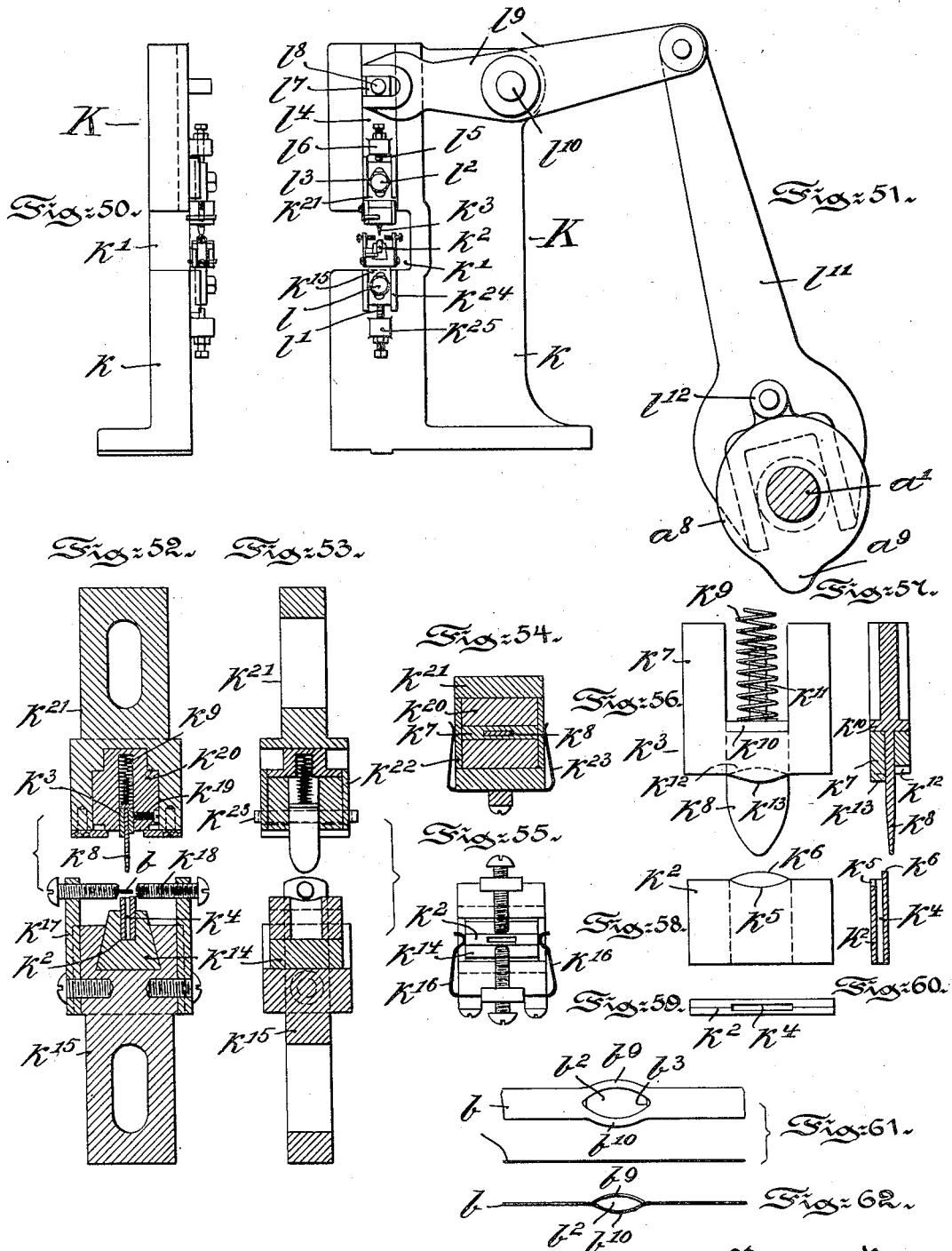

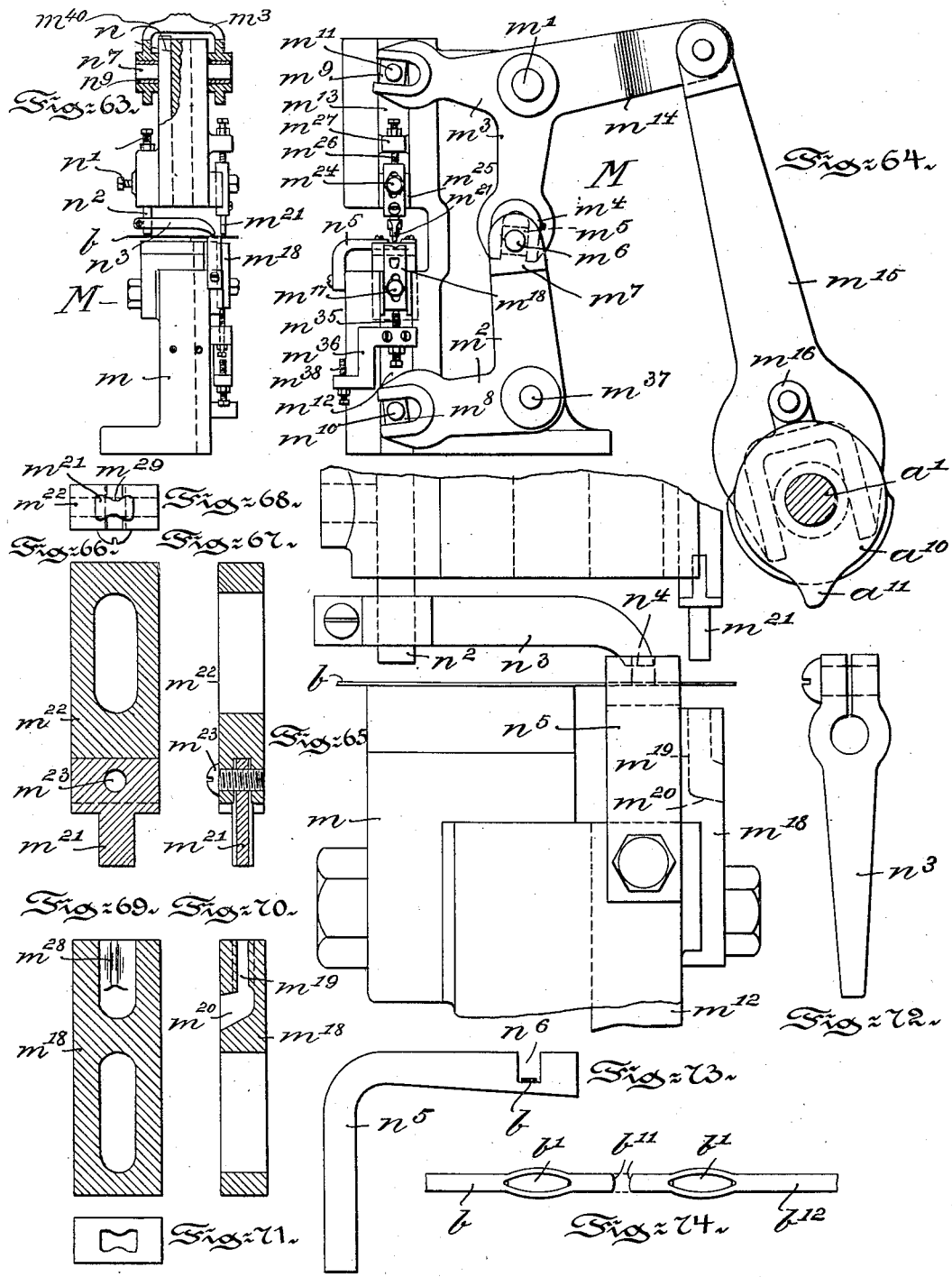

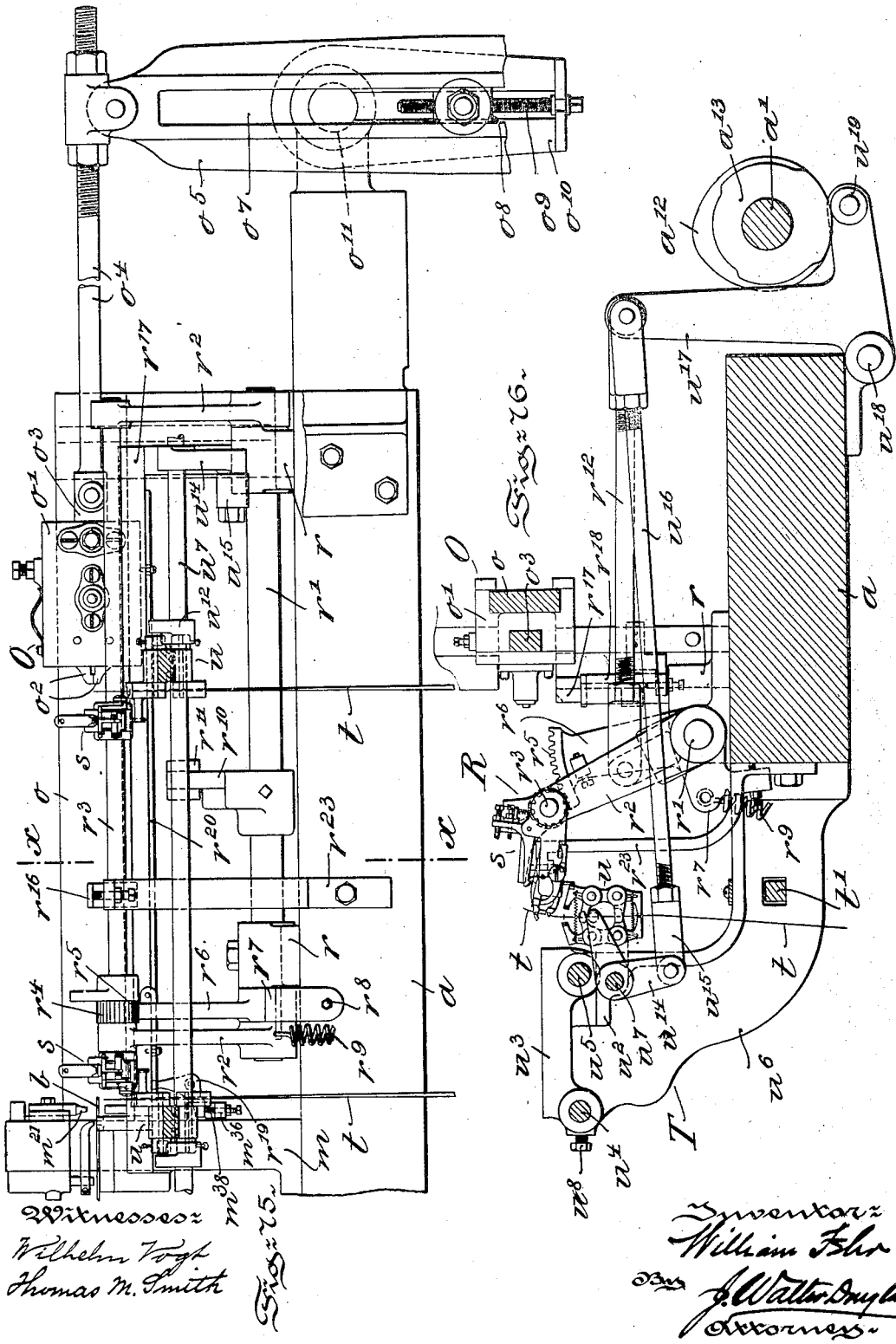

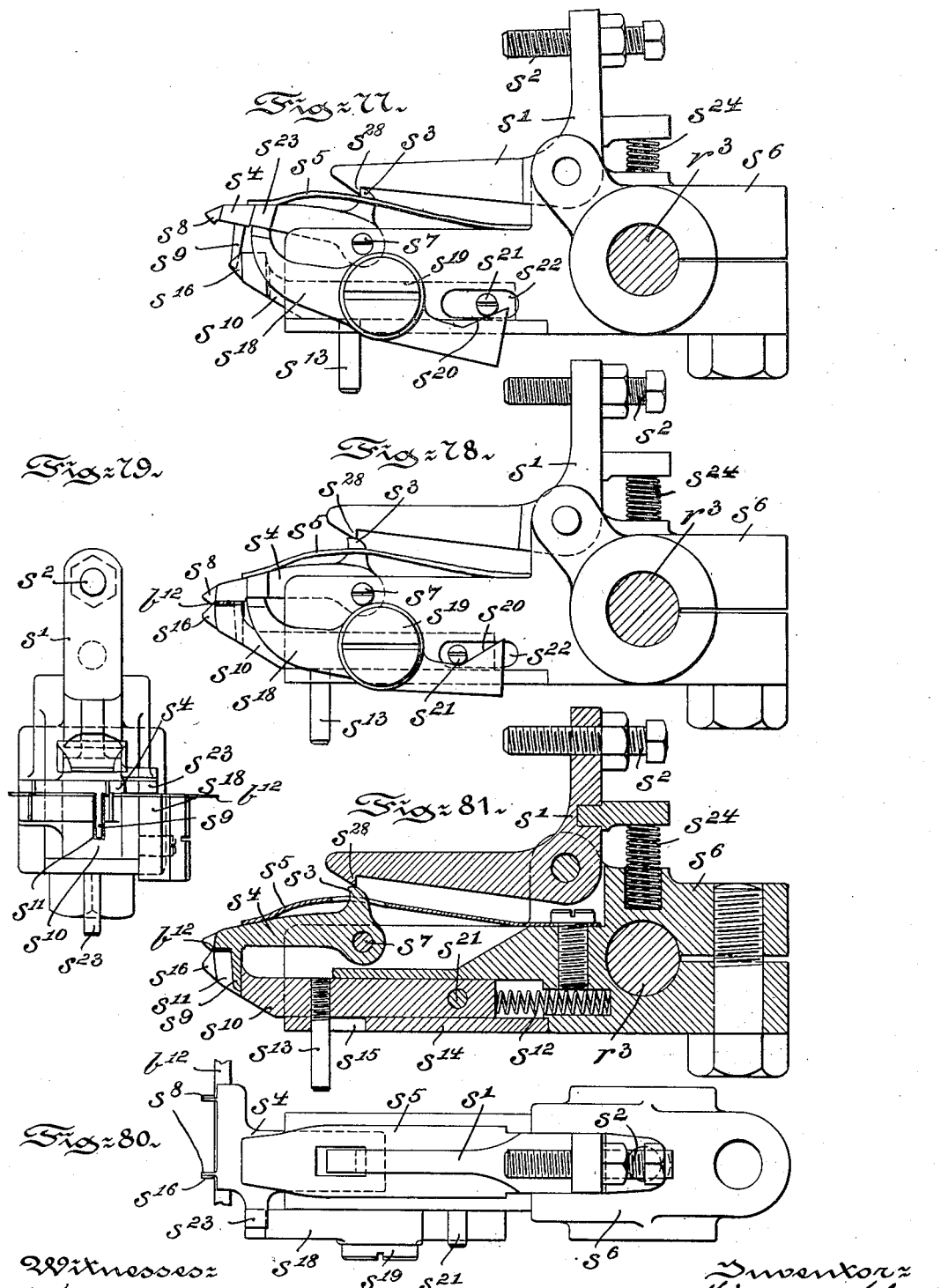

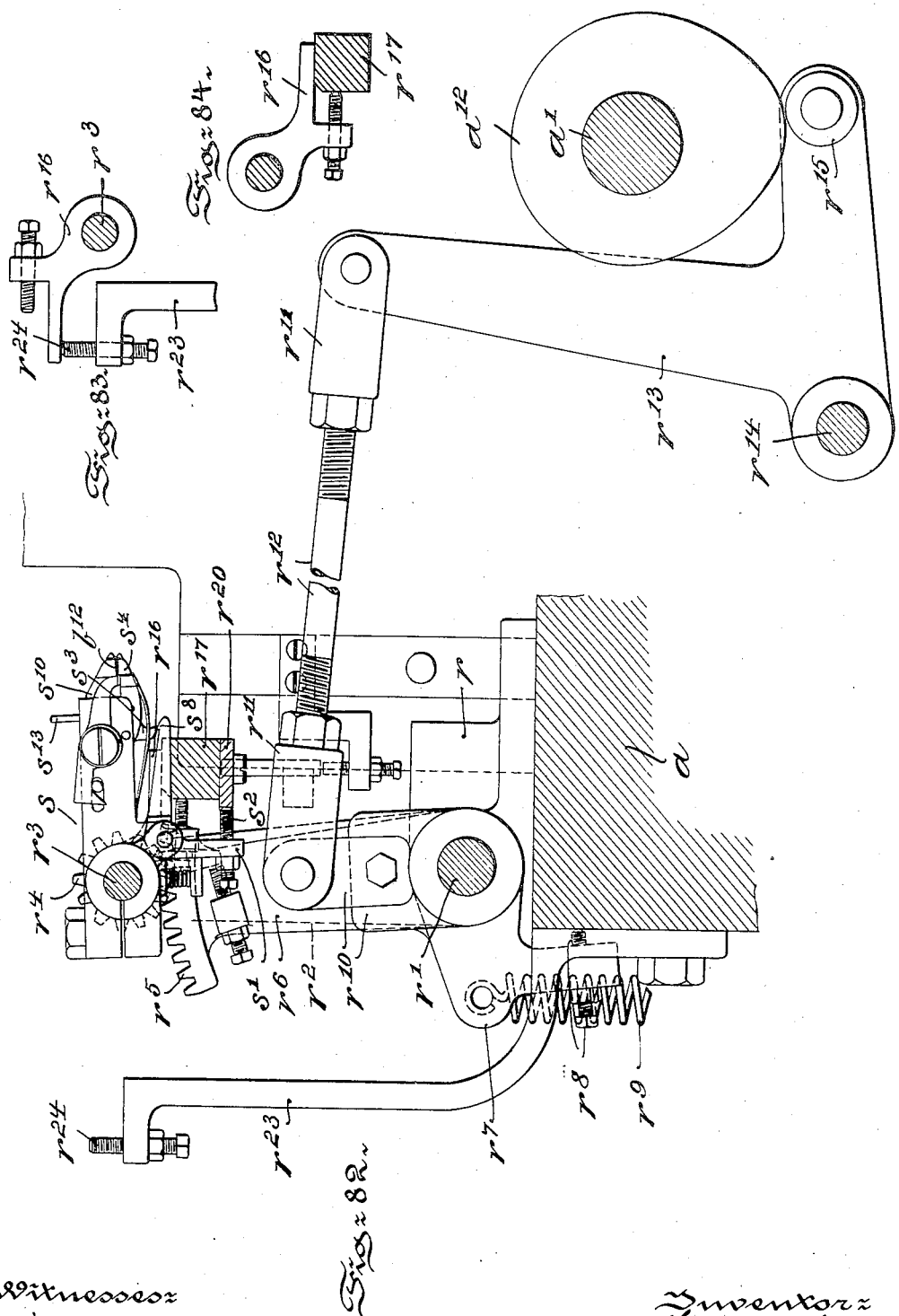

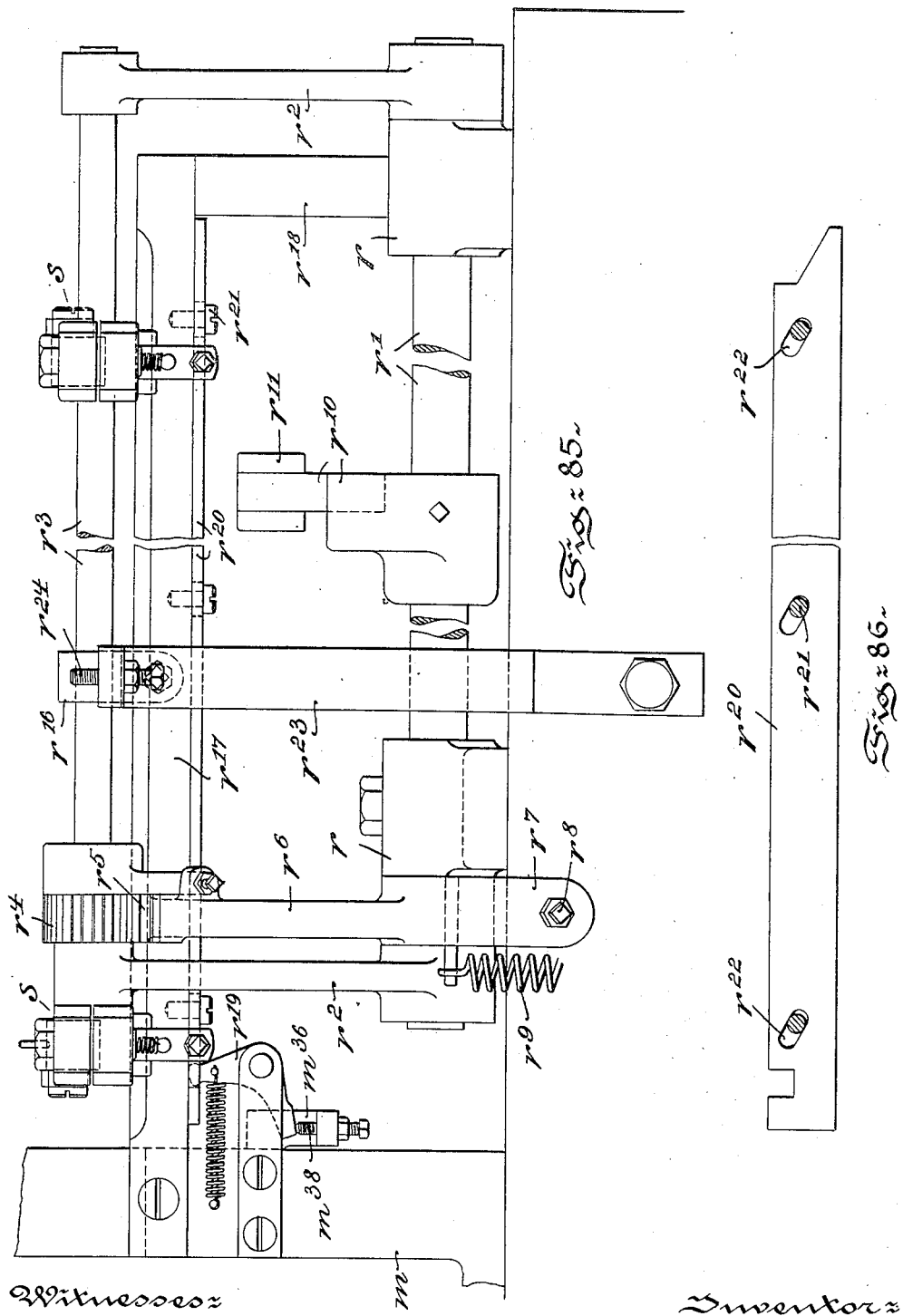

No. 875,659. PATENTED DEC. 31, 1907.
W. FEHR.
MACHINE FOR MANUFACTURING HEDDLES.
APPLICATION FILED DEC. 22, 1905.
17 SHEETS—SHEET 15.
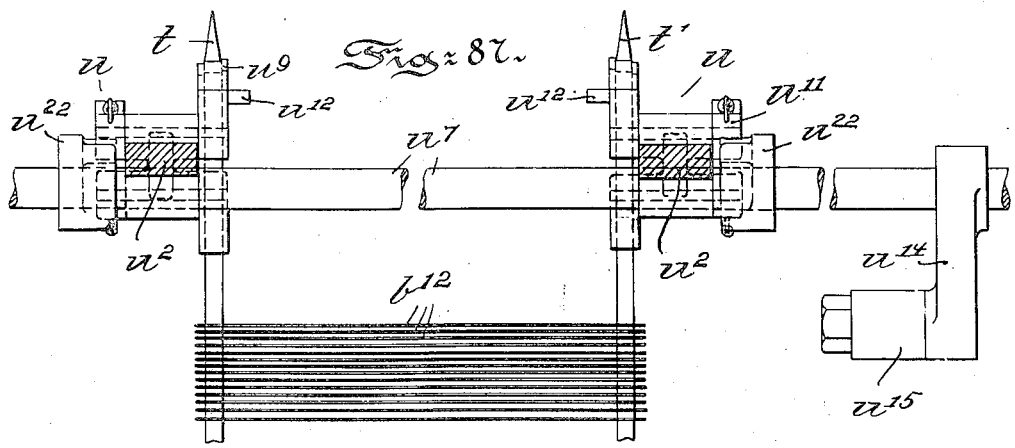
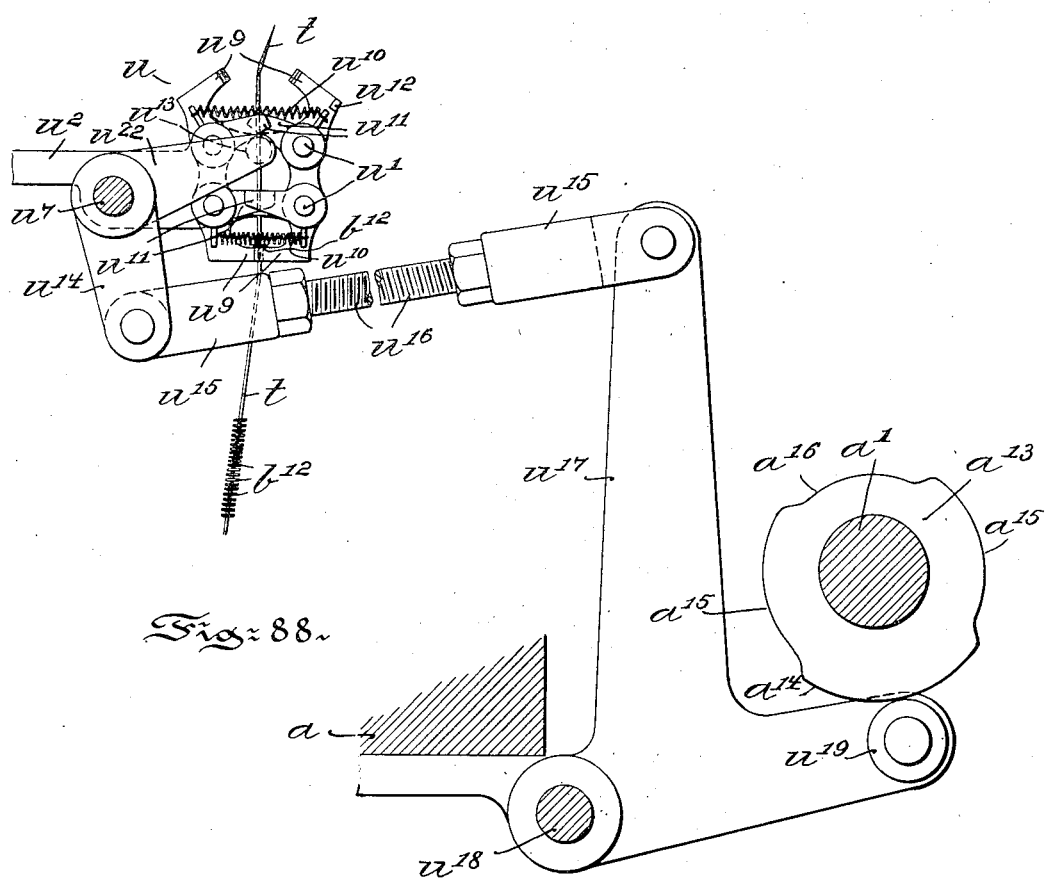

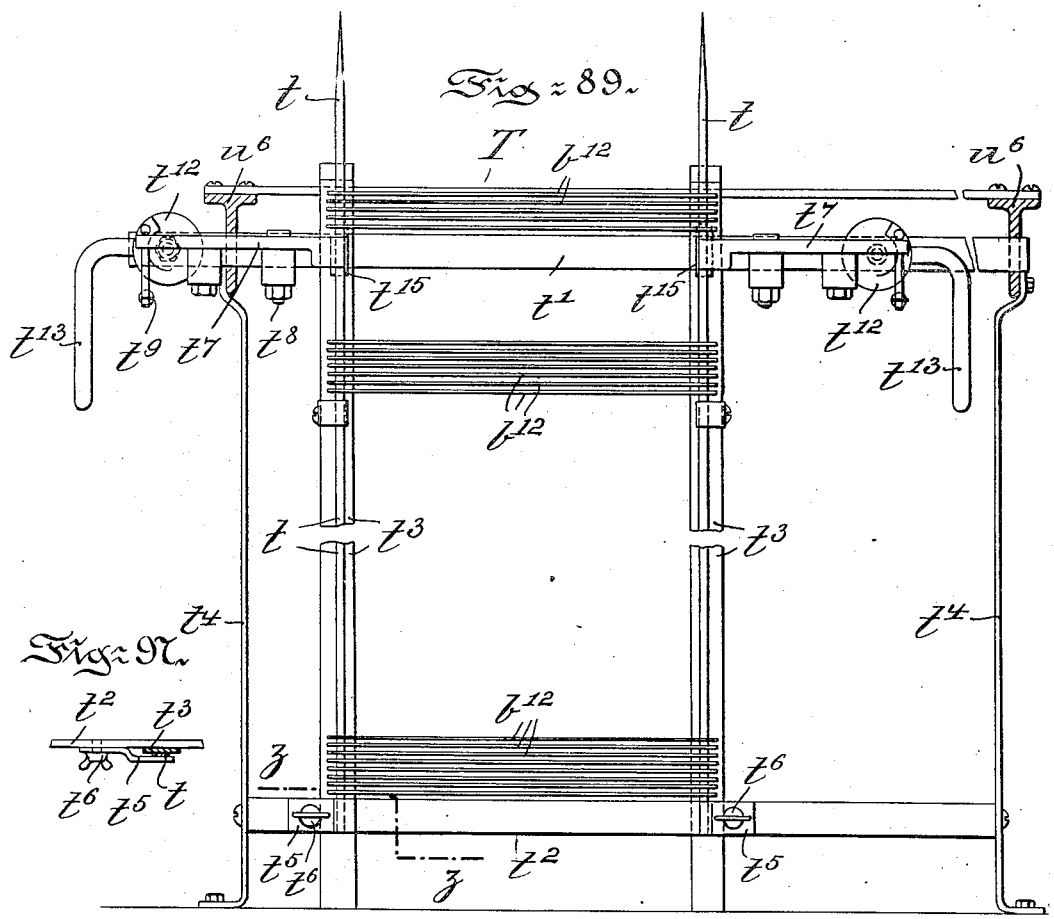
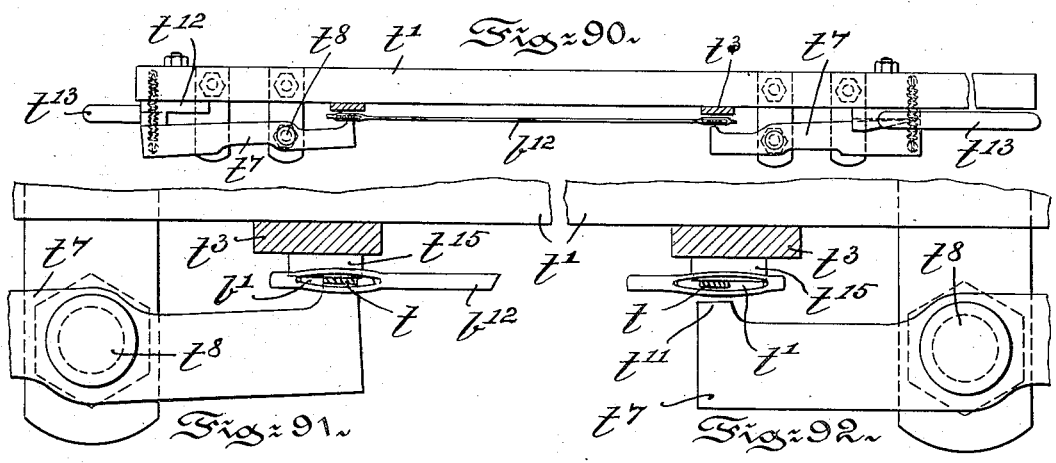

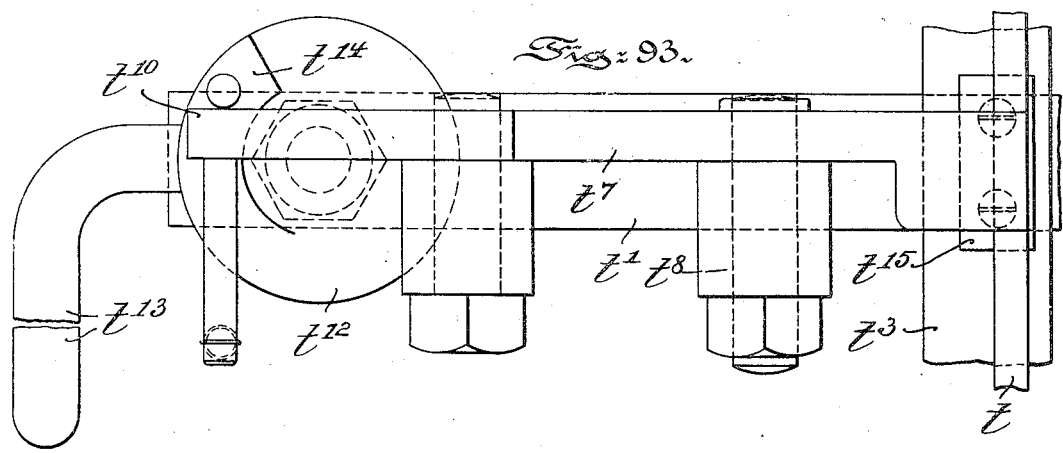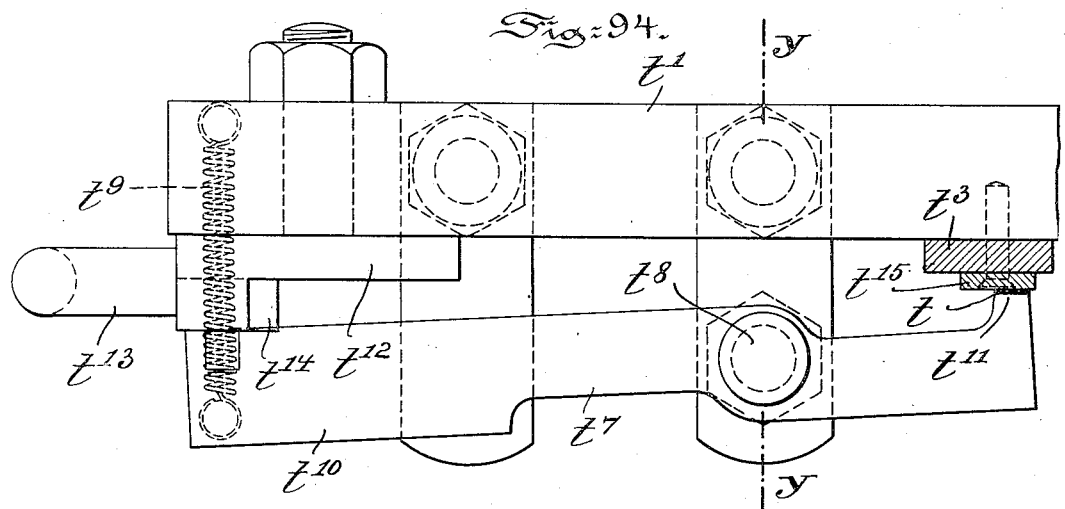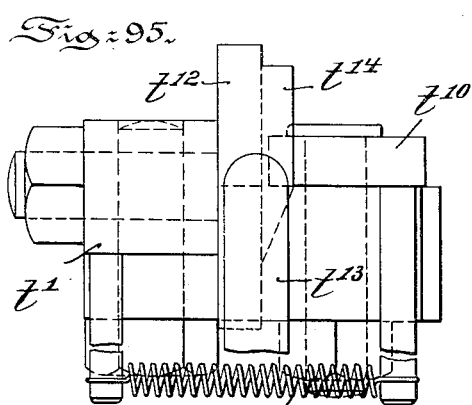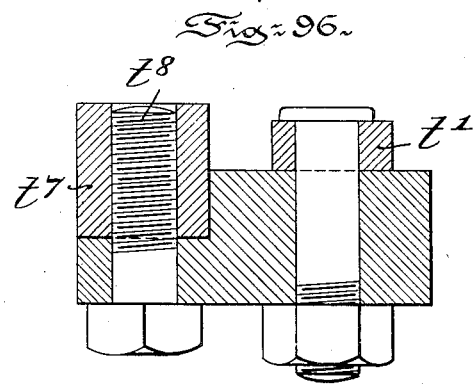

UNITED STATES PATENT OFFICE.

WILLIAM FEHR, OF PHILADELPHIA, PENNSYLVANIA, ASSIGNOR TO STEEL HEDDLE MANUFACTURING COMPANY, OF PHILADELPHIA, PENNSYLVANIA, A CORPORATION OF PENNSYLVANIA.

MACHINE FOR MANUFACTURING HEDDLES.

No. 875,659.  Specification of Letters Patent.  Patented Dec. 31, 1907.

Application filed December 22, 1905. Serial No. 292,946.

*To all whom it may concern:*

Be it known that I, WILLIAM FEHR, a citizen of the United States, residing at the city of Philadelphia, in the county of Philadelphia and State of Pennsylvania, have invented certain new and useful Improvements in Machines for Manufacturing Heddles, of which the following is a specification.

My invention has relation to a machine for manufacturing heddles; and in such connection it relates particularly to the construction and arrangement of such a machine.

The principal objects of my invention are first, to provide a simple and efficient machine adapted to produce from a metal strip or wire, by a series of successive operations, a heddle; second, to provide such a machine with means adapted to punch or perforate the metal strip, in one operation, at varying distances apart, so as to permit of the manufacture of heddles of varying lengths and with the usual end mortises and with one or more eyes; third, to provide the punching or perforating means with mechanism adapted to insure the slotting or piercing of the metal strip in the central longitudinal axis thereof, irrespective of variations in width; fourth, to provide such a machine with swaging or expanding means, adapted to swage or spread the metal either at the ends of the slots punched to expand the same into eyes and mortises of required width or to swage or expand the metal strip or wire into required width of mortises and eyes, prior to the slotting or piercing operation thereof; fifth, to provide such a machine with shaping means to form offsets in the strip of alternately varying outline, which offsets serve to hold the heddles apart when inserted in a heddle frame; sixth, to provide such a machine with bending means for forming eyes in the metal strip, by bending certain slotted portions thereof outward and in opposite directions to each other; seventh, to provide such a machine with combined clamping and cutting means, which means serve to hold the metal strip in position during the slotting, swaging and bending operations and also to permit of the cutting or severing of the same by the cutting means into sections of predetermined length and by the cutting providing the same with straight rounded or any other shape ends; eighth, to provide such a machine with means to grip and feed the metal strip forwards for variable distances prior to the cutting or severing operation; ninth, to provide such a machine with means to engage, remove and to deliver the cut sections or completed heddles onto retainers or bars; and tenth, to provide such a machine with means to hold the heddle retainers in proper position and to permit of the removal of the heddles therefrom, without stopping or interfering with the operation of the machine.

The nature and scope of my invention will be more fully understood from the following description, taken in connection with the accompanying drawings forming part hereof, in which—

Figure 1, is a side elevational view of a machine for the manufacture of heddles, illustrating a bed-plate supporting the punching, swaging, shaping, bending, clamping, cutting, feeding, delivering and retaining means, embodying main features of my said invention. Fig. 2, is an end elevational view of the machine shown in Fig. 1, partly in section. Fig. 3, is a detail view, enlarged, illustrating in side elevation the mechanism for slotting or piercing the metal strip at various points, in one operation, the manner of adjusting the slotting means, and the arrangement for permitting of the use of any desired number of slotting means. Fig. 4, is a cross-sectional view of Fig. 3. Fig. 5, is a detail view, enlarged, illustrating in side elevation a punch holder and a punch held in position by the same. Fig. 6, is a similar view, illustrating partly in top or plan view and partly in section, the punch-holder with the punch removed therefrom, and a portion of a frame supporting the same. Figs. 7 and 8, are cross-sectional views of different portions of the punch holder shown in Fig. 5. Figs. 9 and 10, are detail views, enlarged, illustrating respectively in top or plan view and in side elevation a locking plate for locking certain portions of the punch-holder to its support. Fig. 11, is a view partly in elevation and partly in section of the locking plate and of a bolt for clamping the plate to the punch-holder support. Figs. 12, 13, 14 and 15, are respectively side and end elevations of punches or knives used in conjunction with the punching mechanism shown in Fig. 3. Fig. 16, is a detail view enlarged of a metal strip, and illustrating slots of varying length formed by the punches shown in Figs. 12 to 15 inclusive. Figs. 17 and 18, are similar views, enlarged, illustrating respectively in elevation and in top or plan view a punching die and a stripping plate carried by the same. Fig. 19, is a similar view, illustrating in section the die and its stripping plate. Figs. 20 and 21, are detail views enlarged, of metal strips slotted with the aid of dies and stripping plates shown in Figs. 17, 18 and 19. Figs. 22, 23, 24 and 25, are detail views illustrating respectively in vertical section and in top or plan view, a guide for the metal strip. Figs. 26, 27 and 28, are detail views illustrating, respectively, in side and end elevation and in top or plan view a clamping arm for adjustably connecting the punching dies to a support. Figs. 29, 30 and 31, are detail views, illustrating respectively, in side and front elevation and in cross-section a swaging or expanding mechanism for the metal strip. Figs. 32 and 33, are similar views illustrating respectively, in longitudinal section and in top or plan view a guide for the metal strip used in conjunction with the swaging mechanism. Figs. 34 and 35, are similar views illustrating respectively, in front elevation and in cross-section swaging or expanding tools used in conjunction with a portion of the swaging mechanism supporting the same. Fig. 36, is a view illustrating in section means for limiting the downward movement of a certain portion of the swaging mechanism. Figs. 37 and 38, are views enlarged illustrating in elevation the metal strip prior to and after the swaging operation. Figs. 39 and 40, are views illustrating respectively, in front and side elevation means for shaping or forming offsets of different outline, in the metal strip. Figs. 41 and 42, are detail views enlarged, illustrating respectively in top or plan view and in section means for shifting the shaping dies to bring alternately different portions of the same into an operative position. Figs. 43, 44, 45 and 46, are detail views enlarged, illustrating respectively, in top or plan views and in end elevations the shaping-dies. Figs. 47 and 48, are detail views still further enlarged, illustrating in section various portions of the shaping dies and their holder and the manner of forming offsets differing in outline, in the metal strip. Fig. 49, is a view illustrating in end elevation a number of heddles held a certain distance apart, by the offsets formed in the same by the shaping-dies. Figs. 50 and 51 are views illustrating respectively, in front and side elevation, mechanism for bending certain punched portions of the metal strip in opposite directions to each other to form eyes therein. Figs. 52 and 53, are detail views enlarged, of certain portions of the bending mechanism, illustrating respectively, in longitudinal and in cross section the forming dies and their holders. Fig. 54, is an enlarged horizontal sectional view of the upper forming die and its holder. Fig. 55, is an enlarged top or plan view of the lower forming die and its holder. Figs. 56 and 57, are detail views enlarged illustrating respectively, in side elevation and in vertical section, the upper forming die. Figs. 58, 59 and 60, are similar views, illustrating respectively, in side elevation top or plan view and in vertical section, the lower forming die. Figs. 61 and 62, are views illustrating respectively, in top or plan view and in side elevation, a portion of the metal strip prior to and after the bending of the same to complete the formation of an eye therein. Figs. 63 and 64, are views illustrating respectively, in front and side elevations, mechanism for clamping and cutting the metal strip. Fig. 65, is a detail view enlarged, of the lower portion of the clamping and cutting mechanism. Figs. 66, 67 and 68, are detail views enlarged, illustrating respectively, in end elevation and in vertical section at right angles to each other, the cutting knife and its holder. Figs. 69, 70 and 71, are detail views enlarged, illustrating respectively, in vertical section and in top or plan view, the die used in conjunction with the cutting knife. Fig. 72, is a detail view, illustrating in top or plan view, a clamping arm used in conjunction with the clamping and cutting mechanism for holidng the metal strip in position during the cutting as well as during the punching, swaging and bending operations. Fig. 73, is a detail view enlarged, illustrating a guide arm for the metal strip used in conjunction with the clamping and cutting mechanism. Fig. 74, is a top or plan view illustrating the metal strip after having been cut or severed into two sections. Fig. 75, is a view enlarged, of the right hand end portion of the machine shown in Fig. 1, certain parts thereof being removed therefrom and also illustrating mechanism for feeding the metal strip forward for predetermined lengths prior to the cutting of the same and mechanism for delivering the cut or severed portion of the metal strip now forming a heddle ready for use, to retainers or accumulators for the same. Fig. 76, is a cross-sectional view of Fig. 75, illustrating in end elevation mechanism for delivering and inserting the heddles upon retainers and mechanism for holding the upper end of the retainers in their proper operative position during and after the insertion of the heddles. Figs. 77, 78 and 79, are detail views enlarged, illustrating respectively, in side and front elevations a gripping and delivering finger in open and closed positions. Figs. 80 and 81 are similar views enlarged, illustrating respectively, in top or plan view and in section, the gripping and delivering finger in a closed position.

Fig. 82, is a cross-sectional view enlarged, on the line $x$—$x$, of Fig. 75, and illustrating in side elevation one of the gripping and delivering fingers in a position in which by a slight forward movement the same is ready to engage the metal strip fed forward by the feeding mechanism. Figs. 83 and 84 are detail view senlarged, illustrating respectively, in side elevation and in section means for limiting the rotary and horizontal movements of the gripping fingers. Fig. 85, s a detail view enlarged, illustrating in side elevation, the gripping and delivering fingers in the position shown in Fig. 82, and a portion of the actuating mechanism for the same. Fig 86, is a similar view, illustrating in top or plan view and in section, a bar for actuating a certain part of the gripping and delivering fingers. Fig. 87, is a detail view, illustrating in side elevation the mechanism for holding the upper ends of the retainers in their operative position and permitting the same to accumulate heddles thereon. Fig., 88, is a similar view, illustrating, in end elevation, the holding mechanism for the retainers and the means for actuating the same. Fig. 89, is a view, illustrating partly in side elevation and partly in section, mechanism for supporting the retainers and to permit of the removal of the heddles therefrom, without stopping the operation of the machine. Fig. 90, is a horizontal sectional view of Fig. 89, illustrating in top or plan view clamping mechanism for the retainer bars in an open or inoperative position. Figs. 91 and 92, are detail views enlarged, illustrating partly in top or plan view and partly in section the retainer bars and their clamps and accessories in operative and inoperative positions. Figs. 93 and 94, are similar views still further enlarged, illustrating respectively, in side elevation and top or plan view and partly in section a clamp for a retainer bar and actuating mechanism for the same. Fig. 95, is an end elevational view of Fig. 94. Fig. 96, is a cross-sectional view on the line $y$—$y$ of Fig. 94, and Fig. 97 is a cross-sectional view taken on the line $z$—$z$ of Fig. 89.

Referring to the drawings with reference to Figs. 1 to 28 inclusive, $a$, represents the bed-plate of the machine to which is suitably secured a main or driving shaft $a^1$, driven from any suitable source of power, not shown. To the bed-plate $a$, are removably secured a series of coöperating mechanisms, each performing a certain function in the manufacture of heddles from a metal strip or wire $b$, and of collecting and holding the same in a position, in which, if desired, the completed heddles may be directly shifted on the crossbars of a heddle-frame, as will be hereinafter more fully described. The metal strip or wire $b$, coming directly from a reel or other supporting device, not shown, and if necessary, after having passed through a straightening device, not shown, to remove kinks and curvatures therefrom, is conducted to a punching or perforating mechanism C, which is arranged to punch into the same in one operation, any desired number of slots or openings, at various predetermined distances apart, and if required, in proximity to each other. Thus the punching mechanism permits of the manufacture of heddles of varying lengths and having one or more eyes close together, if necessary, without in the least requiring a change of position of the punching mechanism or the use of several such mechanisms as was necessary in punching mechanisms, as were heretofore employed. In such punching mechanisms slots could not be punched, in proximity to each other, without the use of double cutting knives, or without feeding the strip or wire forward to another and separate punching mechanism, for additional punching of the same.

The punching or perforating mechanism C, consists of a standard $c$, directly bolted to the bed-plate $a$, as shown in Fig. 1, to which are secured guides $c^1$, adapted to afford to a frame $c^2$, in the standard $c$, a range of reciprocatory movements in a vertical plane $e$, as shown in Figs. 3 and 4. These movements are imparted to the frame $c^2$, by means of lever-arms $c^3$, extending from a sleeve $c^5$, and held with their rounded heads $c^4$, in engagement with the frame by a removable plate $c^6$. As shown in Fig. 4, the sleeve $c^5$, carried by a shaft $c^7$, of the standard $c$, is provided with an arm $c^8$, engaged by a lever-arm $c^9$, and the forked end $c^{10}$, of the lever-arm $c^9$, surrounds a roller arranged on the driving-shaft $a^1$, and is provided with a roller $c^{11}$, held in engagement with a cam $a^2$, rigidly secured to the same. When the shaft $a^1$, is rotated, the cam $a^2$, by means of its throw portion $a^3$, raises the lever-arm $c^9$, which in turn by means of the arm $c^8$, and lever-arm $c^3$, depresses the frame $c^2$, in the standard $c$. As soon as the throw portion $a^3$, of the cam $a^2$, has passed the roller $c^{11}$, the lever-arm $c^9$, by means, not shown, raises the frame $c^2$, in the standard $c$, to its normal inoperative position. The frame $c^2$, is provided with a horizontally arranged groove $c^{12}$, communicating with a slot $c^{13}$, which groove and slot permit of the connection of the punch-holder $d$, with the frame $c^2$, and of an adjustment of the same in a horizontal plane $e$ in the frame $c^2$. Each of the punch-holders $d$, consists of two sections one forming the support for the punch $d^1$ or $d^2$ proper, which consists of a plate $d^3$, engaging with its lower laterally projecting end $d^4$, the underside of the frame $c^2$, and with an extension $d^5$, the slot $c^{13}$, of the frame $c^2$; and the other of a clamping plate $d^{10}$, to removably and adjustably clamp the respective punches to their holders. As shown in Figs. 7 and 8, between the extension $d^5$, of the support $d^3$, and the frame $c^2$, in the slot $c^{13}$, is arranged a locking-plate $d^6$, loosely connected with the extension $d^5$, by a bolt $d^7$, which engages an opening $d^8$, of the plate $d^6$, and which serves to lock the support $d^3$, to the frame $c^2$, in the following preferred manner. In the lower portion of the support $d^3$, are arranged threaded bolts $d^{12}$, having outwardly tapering or conical shaped heads $d^{13}$, a certain portion of which is brought into engagement with depressions $d^9$, arranged in the locking plate $d^6$, as shown in Fig. 8. When the bolts $d^{12}$, are advanced in the support $d^3$, the plate $d^6$, and extension $d^5$, of the support $d^3$, are forced apart and thus the same are securely clamped to the frame $c^2$, for a purpose to be presently described.

The punch $d^1$ or $d^2$, is held in a vertical position in its holder $d$, by engaging a depression $d^{11}$ thereof, and the means for adjustably holding the same in engagement with the support $d^3$, consists aside from plate $d^{10}$, of bolts $d^{14}$, having heads $d^{15}$, sliding in the groove $c^{12}$, of the frame $c^2$, and of nuts $d^{16}$, which by bearing against the plate $d^{10}$, force the same against the punch and at the same time the heads $d^{15}$, against the frame $c^2$. In order to adjust the punch in the holder $d$, in a vertical plane to compensate for wear it is only necessary to slightly loosen the nuts $d^{16}$, of the bolts $d^{14}$, after which the punch can readily be moved in the depression $d^{11}$, of the support $d^3$. On the other hand by the removal of the clamping plate $d^{10}$, from the support $d^3$, by removing the nuts $d^{16}$, from the bolts $d^{14}$, the punch can readily be removed therefrom for sharpening or for replacing by another punch, without in the least disturbing the position of the support $d^3$, in the frame $c$. This feature of holding the punch-holder support in its proper position, is important as it insures the return of the punch to the exact position previously occupied by the same. If it becomes necessary to adjust the punch-holder $d$, in its supporting frame $c^2$, or to entirely remove the same therefrom, this can readily be accomplished by merely loosening the nuts $d^{16}$, and the clamping bolts $d^{12}$, after which the holder $d^3$, can be shifted longitudinally in the frame $c^2$. As shown in Figs. 5, 6 and 8, holes $d^{17}$ arranged in the clamping plate $d^{10}$, permit of an access to the heads $d^{13}$, of the clamping bolts $d^{12}$, arranged in the support $d^3$, to tighten or loosen the same with the aid of a suitable tool, not shown. By the above described arrangements of the punch-holder $d$, in the supporting frame $c^2$, it is obvious that heddles of varying length can be produced merely by changing the positions of the punch-holders with respect to each other. Furthermore, any number of slots can be punched in the metal strip or wire $b$, by adding the required number of punch-holders to the frame $c^2$. The slots punched by the punches or knives $d^1$ or $d^2$, in the metal strip $b$, may be in proximity to each other, if desired, for which purpose certain of the holders $d$, are shifted to abut or to nearly so against each other. As shown in Figs. 3, 12, 13, 14 and 15, the punches $d^1$ and $d^2$, employed are of varying width owing to the varying length of slots or openings necessary to be punched in the metal strip or wire $b$. Normally a heddle requires only two slots $b^1$, for the end mortises and one slot $b^2$, for the eye as shown in Fig. 16. However, as hereinbefore stated heddles having any number of slots to form eyes and of any length and width may readily be formed in the metal strip $b$, by the punches $d^1$ and $d^2$, in conjunction with dies $e$, and stripping plates $e^7$, to be presently more fully described.

As shown in Figs. 1, 3 and 4, each of the dies $e$, and their holders $e^1$, are supported by a cross-bar $c^{14}$, removably secured to the standard $c$, of the punching mechanism. The dies $e$ proper, consist of two blocks $e^3$ and $e^4$, one of which is provided with a depression forming a slot $e^5$, of a size sufficient to admit of the entrance of a punch therein. The blocks $e^3$ and $e^4$, are removably secured to their respective holder $e^1$, by clamping bolts $e^6$, preferably bearing against the block $e^3$, and thus holding both blocks securely in position in the holder $e^1$, as shown in Figs. 17, 18 and 19. To the blocks $e^3$ and $e^4$, are removably secured by means of bolts $e^8$, a stripping plate $e^7$, having an opening $e^9$, held in alinement with the slot $e^5$, of the blocks. In addition to the opening $e^9$, the stripping plate $e^7$, is provided with a depression $e^{10}$, at its under side which is adapted to receive and to guide the metal strip or wire $b$, and to hold the same in position on the dies $e^3$ and $e^4$. When the punch $d^1$ or $d^2$, fitting the opening $e^9$, in the stripping plate $e^7$, and the slot $e^5$, of the dies $e^3$ and $e^4$, is actuated by the frame $c^2$, the same pierces or punches in its descent the slots $b^2$ and $b^1$, in the metal strip, as shown in Figs. 20 and 21. The strips of metal punched from the metal strip $b$, are forced through the opening $e^2$, arranged in the die-holder $e^1$, and leaves the same through a slot $c^{15}$, arranged in the cross-bar $c^{14}$, as will be readily understood in conjunction with Fig. 4. The dies $e$, in order to render the same adjustable on the cross-bar $c^{14}$, are held in engagement therewith, by clamping brackets $e^{11}$, bearing with one end against the cross-bar $c^{14}$, and with its other end against the stripping plate $e^7$, of the die $e$, as shown in Fig. 3. A bolt $e^{12}$, engaging with its head $e^{13}$, a depression $e^{14}$, arranged in the bracket $e^{11}$, and passing through slots, not shown, arranged in the cross-bar $c^{14}$, permits in conjunction with nuts $e^{15}$, of the ready adjustment of the dies $e$, on the cross-bar $c^{14}$, or of the removal thereof, by the loosening of the nuts $e^{15}$, on the bolts $e^{12}$, as will be readily understood in conjunction with Figs. 3, 26, 27 and 28.

In order to insure piercing or punching of the metal strip or wire $b$, in its central longitudinal axis and irrespective of its varying width, the following preferred mechanisms are employed:—As shown in Fig. 3, to each side of the dies $e$, are arranged guides $e^{16}$, each of which consists of a supporting plate $e^{17}$, adjustably connected with the cross-bar $c^{14}$, by a bolt $e^{18}$, passing through the slot $c^{15}$, of the cross-bar $c^{14}$, and secured to the same by a washer $e^{19}$ and nut $e^{20}$, as shown in Fig. 4. In the plate $e^{17}$, is arranged a holder $e^{21}$, supporting with its upwardly projecting end a yielding arm $e^{22}$, which is held adjustably thereon by a clamp $e^{24}$, secured to the holder $e^{21}$, as shown in Fig. 22. The free end $e^{23}$, of the yielding arm $e^{22}$, extends downward and between the same and the holder $e^{21}$, forming a rigid guide and passes the metal strip or wire $b$, and is held by the same in proper position with respect to the dies $e$, of the punching mechanism C. The yielding arm $e^{22}$, by permitting uneven or broader portions of the strip or wire $b$, to readily pass between the same and its holder $e^{21}$, prevents a jamming of the strip $b$, in the piercing or punching of the strip in the longitudinal central axis thereof. The guides $e^{16}$, can readily be adjusted to accommodate strips of any desired width, by the mere adjustment of the screw $e^{26}$, and spring $e^{25}$, bearing from opposite sides against the holder $e^{21}$, and thus permitting of a shifting of the same in the plate $e^{17}$, and by the loosening and tightening of the clamp $e^{24}$, bearing down upon the yielding-arm $e^{22}$, after which the same can be adjusted and reclamped in its position, as will be readily understood in conjunction with Figs. 22, 23, 24 and 25.

After the metal strip or wire $b$, has been punched or perforated in the manner hereinbefore described the same is subjected to a swaging or expanding operation by the following preferred mechanism: As shown in Fig. 1, the swaging mechanisms G, are bolted to the bed-plate $a$, and are held by the same a certain distance apart from each other, this distance however, is determined by the respective positions of the slots $b^1$ and $b^2$, in the metal strip $b$, which are to be spread or expanded into mortises and eyes, of the necessary width, by the swaging operation. Each of the swaging or expanding mechanisms G, consists of a support $g$, directly bolted to the bed-plate $a$, to which by means of a threaded bolt $g^3$, is removably secured the swaging tool $g^1$, forming an anvil for the metal strip $b$, which is fed forward by mechanism to be hereinafter more fully described. By this forward movement the metal strip $b$, is brought with three slots previously formed by the punching mechanism C, directly above the tool $g^1$, of each of the swaging or expanding mechanisms G, shown in Fig. 1. As illustrated in Figs. 29, 30, 31, 34 and 35, directly above and held in alinement with the same by a support $g^4$, is arranged a second tool $g^2$, forming in conjunction with the support $g^4$, a hammer which delivers the blow necessary to expand the metal strip in the present instance at the respective ends of the slots $b^1$ and $b^2$. By spreading the metal at these points, the slots formerly oblong in outline, as shown in Fig. 37, are now transformed into slots of oval outline, each having at its respective ends a rib-like portion $b^3$, as shown in Fig. 38. In order to form these rib-like portions $b^3$, each of the tools $g^1$ and $g^2$, taper as at $g^4$, towards their free ends and are slightly curved at the same to form when the tools contact with each other abutting portions $g^5$, and by their outwardly flaring portions $g^6$, wedge shape indentations $g^7$, which permit of the formation of the rib. The metal of the strip $b$, is compressed by the flaring portions $g^6$, of the tools $g^1$ and $g^2$, which thus form at the ends of the respective slots $b^1$ and $b^2$, the rib-like projections $b^3$, which correspond in cross-section with the outline of the wedge-shape indentations $g^7$, formed by the contacting tools. Thus the degree of compression of the metal is the greatest at the point where the same is directly brought into engagement with cross-bars of a heddle frame passing through the mortises $b^1$. It follows therefore, that the swaged portion $b^3$, of the metal strip $b$, forms a reinforcement of the same at the point of greatest wear, which also prevents the tearing of the metal at the ends of the slots otherwise occurring when the metal is not strengthened in the manner hereinbefore described. The upper tool $g^2$, by means of a threaded bolt $g^8$, is removably secured to the support $g^4$, which is of a sufficient weight when raised and released and permitted to descend by gravity to produce the necessary force to compress and spread the metal held in position between the tools $g^1$ and $g^2$, and thereby to expand the narrow slots $b^1$ and $b^2$, in the strip $b$, into mortises and an eye of the required width.

The means for raising and then permitting the hammer $g^4$, to drop, consists of a bell-crank lever $g^9$, pivotally secured in the point $g^{10}$, to a bracket $g^{12}$, formed integral with the support $g$, and bearing with its arm $g^{11}$, against a projection $g^{13}$, of the hammer support $g^4$. The projection $g^{13}$, in the point $g^{14}$, is pivotally secured to a bracket $g^{15}$, formed integral with the support $g$, and thus the hammer support $g^4$, has a range of oscillating movement in the bracket $g^{15}$, which is imparted to the same in an upward direction by a cam $a^4$, secured to the driving shaft $a^1$, and engaging a roller $g^{16}$, of the lever $g^9$, and in a downward direction by gravity, as soon as the roller $g^{16}$, leaves the highest part $a^5$, of the throw portion of the cam $a^4$, as shown in Fig. 29. However, the downward movement of the support $g^4$, and its tool $g^2$, forming a hammer is limited by a threaded bolt $g^{17}$, abutting with its lower end against a bolt $g^{18}$, arranged in the support $g$, of the swaging mechanism G, as shown in Figs. 29, 31 and 36. Thus the downward movement of the tool $g^2$, is limited at the moment its portion $g^6$, is brought into proximity to the portion $g^5$, of the tool $g^1$.

In order to insure the swaging of the metal strip $b$, at the ends of the slots $b^1$ and $b^2$, and in the longitudinal central axis of the same, the metal strip is conducted through guides $g^{19}$, arranged at each side of the tools $g^1$ and $g^2$, as shown in Fig. 30. Each of the guides $g^{19}$, consists preferably of a bar $g^{20}$, adjustably secured to the support $g$, of the swaging mechanism G. The bar $g^{20}$, is provided with an adjustable guide $g^{21}$, extending in the path of the metal strip $b$, and forming a rigid guide for the same. Opposite the guide $g^{21}$, and limited in its movement by a projection $g^{25}$, of a plate $g^{24}$, secured to the bar $g^{20}$, is arranged a yielding guide, consisting of a leaf-spring $g^{22}$, abutting with its downward projecting end $g^{23}$, against the strip $b$, as shown in Fig. 32, and secured at its lower end to the support $g$, as shown in Figs. 29 and 30. Thus the guide $g^{22}$, by yielding enables portions of the metal strip $b$, differing in width to readily pass between the guides $g^{21}$ and $g^{22}$. In this manner the metal strip $b$, is prevented from jamming between these guides and is held by the same irrespective of varying width, in a position which insures the swaging of the strip in the longitudinal central axis thereof.

Instead of swaging the metal strip $b$, after the punching of the slots $b^1$ and $b^2$, therein, the swaging of the same may take place prior to the punching operation, in which instance the swaging mechanism G, is placed in front of the punching mechanism C, on the bed-plate $a$, of the machine as shown in Fig. 1.

After the swaging of the metal strip $b$, has been completed, in the manner and by the mechanism hereinbefore described, the strip is conducted to a shaping mechanism, which bends the strip $b$, and forms preferably in the mortises $b^1$ thereof, offsets differing in outline one from the other. As shown in Figs. 1, 39 and 40, the shaping mechanism H, preferably consists of a standard $h$, secured to the bed-plate $a$, of the machine. The standard $h$, is provided with an opening $h^1$, in which are arranged and permitted to move therein dies $h^2$ and $h^3$, the contiguous faces of which differing in outline form a plurality of dies. The lower die $h^2$, is provided with rib-like projections $h^4$, and the upper die $h^3$, with grooves or depressions $h^5$, extending transversely over the same. Between the projections $h^4$, and grooves $h^5$, each of the dies $h^2$ and $h^3$, is provided with a raised portion $h^6$, and a depression $h^7$, respectively, tapering downward and rising upward from a median line $h^8$, parallel to the projections $h^4$, and depressions $h^5$, as shown in Figs. 43, 44, 45 and 46. Beyond the projections $h^4$, and grooves $h^5$, and on the front portion of the lower die $h^2$, are arranged flat projections $h^9$, having downwardly tapering sides $h^{10}$, and on the corresponding portion of the upper die are arranged upwardly inclined portions $h^{11}$, terminating in flat portions $h^{12}$. In contra-distinction thereto, both rear portions of the dies are provided with flat portions $h^{13}$ only, and thus the metal strip $b$, when different portions thereof are alternately brought between the front and rear portions of the dies the strip $b$ will be provided with different shape offsets. The preferred means for moving one of the dies towards and away from the other die in a vertical plane and for bringing alternately the front and rear portions of the dies into an operative position by shifting the same in a horizontal plane, the following preferred mechanism is employed.

As shown in Figs. 39 and 40, the extension $h^{15}$, of the holder $h^{14}$, of the lower die $h^2$, is secured to the standard $h$, by means of a bolt $h^{16}$, passing through a slot in the extension $h^{15}$, and by projections $h^{17}$, which engage the same from opposite sides. At its lower end the extension $h^{15}$, rests upon a threaded bolt $h^{18}$, arranged in a boss $h^{19}$, of the standard $h$, which bolt is adapted to permit of the adjustment of the lower die $h^2$, in a vertical plane in the standard $h$. The extension $h^{21}$, of the holder $h^{20}$, of the upper die $h^3$, by means of a bolt $h^{22}$, and ribs $h^{23}$, is secured to a slide $h^{24}$, arranged in the standard $h$, and is thus movably secured to the same. A threaded bolt $h^{25}$, passing through a boss $h^{26}$, of the slide $h^{24}$, and engaging the extension $h^{21}$, serves to determine the position of the upper die $h^3$, with respect to the slide $h^{24}$, and thus to the lower die $h^2$. A block $h^{26}$, pivotally secured to a bolt $h^{27}$, of the slide $h^{24}$, is engaged by a lever $i$, pivotally secured in the point $i^1$, to the standard $h$, and provided at its free end with a roller $i^2$, engaging a cam $i^3$, carried by a shaft $i^5$, supported by an extension $h^{28}$, of the standard $h$. When the cam is rotated its throw-portions $i^4$, are alternately brought into engagement with the roller $i^2$, of the lever $i$, which by being actuated depresses the upper die $h^3$, and brings the same for a short period of time into engagement with the lower die $h^2$, to permit both dies to form an offset in the metal strip $b$, passed between said dies. As the front and rear portions of the dies differ in outline from each other in order to form different shape offsets in the metal strip $b$, it is necessary to shift the dies $h^2$ and $h^3$, in their respective holders $h^{14}$ and $h^{20}$. This is accomplished by a bar $i^6$, engaging an extension $h^{29}$, of the lower die $h^2$, and having at its free end a roller $i^7$, which is held in the path of a cam $i^8$, secured to the shaft $i^5$, by means, not shown. The cam, $i^8$, is provided with two throw portions $i^9$ and $i^{10}$, which when brought alternately into engagement with the roller $i^7$, and in conjunction with a spring not shown, shifts bar $i^6$, and by the same the lower die $h^2$, back and forth in the holder $h^{14}$. The reciprocatory movement of the lower die $h^2$, by means of a plate $h^{30}$, secured to the same, is transmitted to the upper die $h^3$, which is connected with the plate $h^{30}$, by a bolt $h^{31}$, engaging a slot $h^{32}$. The upper die $h^3$, by the intervention of the plate $h^{30}$, is thus directly actuated by the lower die $h^2$, which by its slot $h^{32}$, permits of an independent reciprocatory movement of the upper die $h^3$, in a vertical plane.

As shown in Fig. 40, the shaft $i^5$, is actuated by a gear-wheel $i^{11}$, meshing with a gear-wheel $a^7$, secured to the driving shaft $a^1$. The gear wheels $i^{11}$ and $a^7$, are so proportioned, that the shaft $i^5$, will complete one revolution, when the driving shaft $a^1$, has completed two revolutions. By the arrangement of the throw portions $i^4$, of the cam $i^3$, the upper die $h^3$, will be brought into engagement with the lower die $h^2$, at each revolution of the driving shaft $a^1$, and at the same time by the intervention of the throw portions $i^9$ and $i^{10}$, of the cam $i^8$, and by a spring, not shown, both dies $h^2$ and $h^3$, will be shifted so as to bring alternately and at each revolution of the driving shaft $a^1$, one of the portions of the dies into an operative position, in the standard $h$. If thus the front portions of the dies $h^2$ and $h^3$, are shifted into an operative position, the metal strip $b$, will be bent sidewise in the manner shown in Fig. 47, and an offset $b^4$, will be formed in the same, consisting of an angular portion $b^6$, having adjacent to the straight portions of the metal strip two V-shaped portions $b^7$, bent sidewise in a direction opposite to that of the angular portions $b^6$. When the rear portions of the dies $h^2$ and $h^3$, occupy an operative position the metal strip $b$, which has been advanced for a certain predetermined distance in a direction from left to right in Fig. 1, will be provided with an offset $b^5$, consisting of an angular portion $b^8$, bent sidewise and in an opposite direction to the angular portion $b^6$, of the offset $b^4$, and which at its ends is separated from the straight portions of the strip $b$, by two V-shaped portions $b^7$, bent sidewise, but in the same direction as the portion $b^8$, as illustrated in Fig. 48. Thus by the particular outline of the contiguous faces of the dies $h^2$ and $h^3$, in the manner hereinbefore described, two different shaped offsets $b^4$ and $b^5$, are formed in regular sequence, in the metal strip $b$, which when the metal strip is cut in sections and the sections placed one above the other will hold the same a certain distance apart, as shown in Fig. 49. However, the shape of the offsets $b^4$ and $b^5$, may be changed ad libitum by introducing into the holders $h^{14}$ and $h^{20}$, of the shaping mechanism H, dies having contiguous faces of an outline differing from those of the dies $h^2$ and $h^3$, shown, or having more than two different shape portions arranged in alinement with each other. In addition to holding the sections of the metal strip a certain distance apart, the offsets $b^4$ and $b^5$, perform the functions of springs in that they will separate the sections and return the same to their proper position, when the sections by pressure or otherwise have been forced against each other. After the metal strip has been provided with offset portions $b^4$ and $b^5$, the same is conducted to a bending mechanism K, arranged adjacent to the shaping mechanism H, on the bed-plate $a$, of the machines as shown in Fig. 1. The bending mechanism K, bends the metal strip at the slotted portion $b^2$, outward in opposite directions and thus completes the eye in the strip $b$, which has been partially finished by the punching mechanism C, and swaging mechanism G.

As shown in Figs. 50 and 51, the bending or eye forming mechanism K, preferably consists of a standard $k$, having an opening $k^1$, in which are arranged superposed dies $k^2$ and $k^3$, the lower die $k^2$ proper, is provided with a slot $k^4$, and with a depression $k^5$, and a projection $k^6$, at its upper face, as shown in Figs. 58, 59 and 60. The upper die $k^3$ proper, consists of a U-shaped frame $k^7$, having movably arranged therein a tapering blade $k^8$, which by the intervention of a spring $k^9$, engaging the base $k^{10}$, and surrounding a stem $k^{11}$, thereof, is normally held in a position in which the same projects a certain distance beyond the die $k^3$. At its lower face and at the respective side of the blade $k^8$, the upper die $k^3$, is provided with a depression $k^{12}$, and a projection $k^{13}$, similar in outline to the depression and projection of the lower die $k^2$, but reversed in their arrangement so as to permit of the engagement of the projection of one die in the depression of the other die, as will be readily understood in conjunction with Figs. 56 to 60, inclusive. The lower die $k^2$, is secured to a block $k^{14}$, which is slidably arranged in a holder $k^{15}$, and is held in proper position therein by springs $k^{16}$, engaging the block $k^{14}$, from opposite sides, as shown in Fig. 55. The holder $k^{15}$, is provided with arms $k^{17}$, adjustably supporting guide-screws $k^{18}$, between which the metal strip $b$ passes, and which serve to hold the same in proper position between the dies $k^2$ and $k^3$, as shown in Fig. 52. The U-shaped upper die $k^3$, by means of a set screw $k^{19}$, is secured to a block $k^{20}$, slidably supported in a holder $k^{21}$, by plates $k^{22}$, and is held in proper position by a spring $k^{23}$, secured to the holder $k^{21}$, as shown in Fig. 54. The holder $k^{15}$, for the lower die $k^2$, by means of a bolt $l$, and projections $k^{24}$, engaging the same from opposite sides, is adjustably secured to the standard $k$. At its lower end the die-holder $k^{15}$, rests upon a threaded bolt $l^1$, arranged in a boss $k^{25}$, of the standard $k$, which serves to adjust the lower die $k^2$, in a vertical plane in the standard $k$. The holder $k^{21}$, for the upper die $k^3$, by means of a bolt $l^2$, and ribs $l^3$, is secured to a slide $l^4$, arranged in the standard $k$, and by the intervention of a bolt $l^5$, of a boss $l^6$, can be adjusted in a vertical plane on the slide $l^4$. A block $l^7$, pivotally secured to a bolt $l^8$, of the slide $l^4$, is engaged by a lever $l^9$, pivotally secured in the point $l^{10}$, to the standard $k$, which by means of an arm $l^{11}$, surrounding with its free end a roller on the driving shaft $a^1$, is connected with a cam $a^8$, thereof. At each revolution of the driving shaft $a^1$, the throw portion $a^9$, of the cam $a^8$, by means of a roller $l^{12}$, secured to the arm $l^{11}$, will actuate the same and lever $l^9$, to depress the slide $l^4$, in the standard $k$, and thus bring the upper die $k^3$, into engagement with the lower die $k^2$. During the downward movement of the upper die $k^3$, the blades $k^8$, is first brought into engagement with the lower die $k^2$, by entering the slot $k^4$, after which the projections $k^6$ and $k^{13}$, will be brought into engagement with the shanks $b^9$ and $b^{10}$, formed by the slot $b^2$, in the metal strip $b$, and will force the same into the depressions $k^5$ and $k^{12}$, of the dies. The shanks $b^9$ and $b^{10}$, of the metal strip occupying the position shown in Fig. 61, will thus be bent outwards as shown in Fig. 62 and the eye $b^2$, will be brought into the shape required to support a thread, not shown, in a position at a right angle to the mortises $b^1$.

In case the eye $b^2$, in the metal strip $b$, does not occupy the proper position with respect to the dies $k^2$ and $k^3$, the same will automatically be brought into a position in alinement with the eye in the following manner: The blade $k^8$, of the upper die $k^3$, will with its pointed end first be brought into engagement with the slot $b^2$, of the strip $b$, and by descending into the same one of its inclined sides will contact with one or the other of the swaged portions $b^3$, and be shifted sidewise by the strip $b$. This movement imparted to the blade $k^8$, is transmitted by the same to the upper die $k^3$, and to the lower die $k^2$, by descending into the slot $k^4$ thereof. The dies $k^2$ and $k^3$, are thus moved sidewise in the holders $k^{15}$ and $k^{21}$, against the tension of their respective springs $k^{16}$ and $k^{23}$, and are held in this position until the eye $b^2$, is formed in the strip $b$. As soon as the upper die $k^3$, is raised and its blades $k^8$, disengaged from the lower die $k^2$, and the metal strip $b$, the springs $k^{16}$ and $k^{23}$, return the same to their normal position in the respective holders $k^{15}$ and $k^{21}$.

If on the other hand the metal strip should be so shifted that its eye $b^2$, is beyond the reach of the blade $k^8$, of the upper die $k^3$, or a slot should not have been punched therein, the same by abutting against the metal strip $b$, will be moved backwards into an inoperative position in the die $k^3$, against the tension of the spring $k^9$, bearing with its upper end against the block $k^{20}$, and will thus be prevented from being broken during the downward movement of the die $k^3$. The formation of the eyes $b^{20}$, in the metal strip $b$, being thus completed the strip $b$, is shifted forward and by this movement is conducted to a combined cutting and clamping mechanism M, which is arranged adjacent to the bending mechanism K, on the bed-plate $a$, of the machine, as shown in Fig. 1. This mechanism M, cuts the metal strip $b$, into sections of predetermined length and at the same time clamps and holds the strip $b$, in position during the punching, swaging, shaping and bending operations to which as hereinbefore described, the strip is subjected before reaching this mechanism.

As shown in Figs. 63 and 64, the combined cutting and clamping mechanism M, preferably consists of a standard $m$, to which in the points $m^1$ and $m^{37}$, respectively, are pivotally secured bell crank levers $m^2$ and $m^3$. The bell-crank lever $m^3$, at its lower end $m^4$, is forked to engage a block $m^5$, pivotally supported by a bolt $m^6$, arranged in the forked end $m^7$, of the bell-crank lever $m^2$. Both bell-crank levers at their free ends engage blocks $m^8$ and $m^9$, pivotally secured by bolts $m^{10}$ and $m^{11}$, to slides $m^{12}$ and $m^{13}$, arranged respectively, in the upper and lower portions of the standard $m$, and having a range of movement towards and away from each other in a vertical plane therein. In addition to the slide $m^{13}$, in the upper portion of the standard $m$, is arranged a slide $n$, to which is adjustably secured by bolts $n^1$, a rod $n^2$, carrying a clamping arm $n^3$, the downwardly projecting end $n^4$, of which is held above a groove $n^6$, arranged in a guide-arm $n^5$. The guide arm $n^5$, is rigidly secured to the standard $m$, and its object is to hold the metal strip $b$, in proper position and to permit of the clamping of the same by the clamping arm $n^3$, so as to hold the strip rigidly in position during the punching, swaging shaping and bending operations, as hereinbefore described. The slide $n$, is actuated by an arm $m^{44}$, of the same outlined as the lever $m^3$, and branching therefrom which engages the bolt $n^7$, of the slide $n$. The movements of the slides $m^{12}$ and $m^{13}$, towards and away from each other, as well as of the slide $n$, is imparted to the same by an arm $m^{14}$, of the bell-crank lever $m^3$, which by means of an arm $m^{15}$, is connected with a cam $a^{10}$, secured to the driving-shaft $a^1$. During each revolution of the driving-shaft $a^1$, the cam $a^{11}$, by means of its throw-portion $a^{11}$, engaging a roller $m^{16}$, actuates the arms $m^{15}$ and $m^{13}$, and by the same and bell-crank levers $m^2$ and $m^3$, actuates the slides $m^{12}$, $m^{13}$ and $n$. To the lower slide $m^{12}$, by means of a bolt $m^{17}$, is secured a die $m^{18}$, having in its upper end an opening $m^{19}$, communicating with an opening $m^{20}$, forming an outlet for the opening $m^{19}$, as shown in Figs. 69 and 70. The position of the die $m^{18}$, on the slide $m^{12}$, can be adjusted by a bolt $m^{35}$, passing through a bracket $m^{36}$, secured to the slide $m^{12}$.

Directly above the lower die and held in alinement with the opening $m^{19}$ thereof, is arranged the upper die $m^{21}$, which by means of a bolt $m^{23}$, is secured to a holder $m^{23}$, connected with the upper slide by a bolt $m^{24}$, and projections $m^{25}$, of the same. A bolt $m^{26}$, passing through a boss $m^{27}$, of the slide $m^{13}$, permits of the adjustment of the same with respect to the slide $m^{13}$, and thus with the lower die $m^{18}$. The dies $m^{18}$ and $m^{21}$, when brought in engagement with the metal strip $b$, from opposite sides thereof, and the upper die $m^{21}$, by passing into the opening $m^{19}$, of the lower die $m^{18}$, cuts or severs the metal strip $b$, in the manner shown in Fig. 74. The metal portions severed from the metal strip $b$, leave the die $m^{18}$, through the opening $m^{20}$. The ends $b^{11}$, of the severed strip $b$, are preferably rounded as shown in Fig. 74, for which purpose the opening $m^{19}$, in the lower die $m^{18}$, is contracted at $m^{28}$, as shown in Figs. 69, 70 and 71, and the upper die $m^{21}$, in a similar manner at $m^{29}$, as shown in Figs. 67 and 68. During the downward movement of the upper die $m^{21}$, and slightly in advance of the engagement of the same with the metal strip $b$, the clamp-arm $n^3$, has been brought to bear against the strip $b$, and to hold the same securely in position in the guide-arm $n^5$, during the cutting operation as will be readily understood in conjunction with Fig. 65. The guide-arm $n^5$, under the pressure of the clamp arm $n^3$, yields slightly and thus the clamp arm $n^3$, is permitted to complete its downward movement, without breaking.

After the cutting or severing of the strip $b$, has been completed the dies $m^{18}$ and $m^{21}$, are returned to their normal inoperative position slightly in advance of the clamping arm $n^3$, leaving a certain portion of the strip $b$, projecting beyond the guide-arm $n^5$, which is engaged by a gripping mechanism O, such as has been shown and described in Letters Patent No. 699,508 granted to me under date of May 6th 1902, for feeding the metal strip $b$, forwards, for variable lengths.

As shown in Figs. 75 and 76, the gripping and feeding mechanism O, consists of a guide-bar $o$, suitably secured to the bed-plate $a$, of the machine upon which is adapted to reciprocate a casing $o^1$, in which are arranged gripping-jaws $o^2$, such as are shown and described in Letters Patent No. 699,508, granted to me under date of May 6th, 1902, actuated by a slide $o^3$, in a manner not shown, which slide is connected by a rod $o^4$, with a lever-arm $o^5$. As shown in Figs. 1 and 75, the lever-arm $o^5$, by means of a bracket $a^6$, is connected with the bed-plate $a$, of the machine and is provided with a slot $o^7$, in which is arranged a block $o^8$, connected by a threaded spindle $o^9$, with a crank-arm $o^{10}$, secured to a shaft $o^{11}$, actuated by the driving shaft $a^1$, by means of bevel gears, not shown, respectively secured to the main driving shaft $a^1$, and the shaft $o^{11}$. When the crank-arm $o^{10}$, is rotated the lever-arm $o^5$ is oscillated on its fulcral point $o^{12}$, and by this movement and the rod $o^4$, the casing $o^1$, is reciprocated on the guide-bar $o$, for a certain distance. By the adjustment of the block $o^8$, on the spindle $o^9$, the movement imparted to the lever-arm $o^5$, by the crank-arm $o^{10}$, may be increased or decreased and accordingly the metal strip $b$, may be fed forwards for varying lengths. When the slide $o^3$, is moved from right to left in Fig. 75, the gripping jaws $o^2$, are opened and shifted over the projecting end of the metal strip $b$. Prior to the movement of the casing $o^1$, from left to right, in Fig. 75, the gripping jaws $o^2$, are closed by the slide $o^3$, and brought into engagement with the metal strip $b$, after which the casing $o^1$ is moved forward for a certain distance dragging the metal strip along which is then released by the jaws $o^2$, at the beginning of the backward movement of the slide $o^3$.

Before or at the moment of completion of the forward movement of the metal strip $b$, the same is engaged by an oscillating gripping and delivering mechanism R, which grips and inserts the cut sections of the metal strip $b$, which now form completed heddles, upon a retaining mechanism T, to be hereinafter more fully described.

As shown in Figs. 75 and 84 inclusive, the oscillating gripping and delivering mechanism R, for the completed heddles $b^{12}$, consists of brackets $r$, secured to the bed-plate $a$, of the machine, in which is arranged a shaft $r^1$, serving as a support for lever-arms $r^2$. The lever-arms $r^2$, serve to support a shaft $r^3$, to which are adjustably secured gripping fingers $s$, and a gear-wheel $r^4$, meshing with a toothed sector $r^5$, preferably formed integral with an arm $r^6$, loosely mounted on the shaft $r^1$, and held in position thereon, by an extension $r^7$, bearing with a set-screw $r^8$, against the bed-plate $a$, and by a spring $r^9$, tending to hold the set-screw $r^8$, of the extension $r^7$, in engagement with the bed-plate, as shown in Figs. 76 and 82. To the shaft $r^1$, by means of a crank-arm $r^{10}$, links $r^{11}$, rod $r^{12}$, and a lever-arm $r^{13}$, pivotally secured in the point $r^{14}$, to the bed-plate $a$, of the machine, is imparted a rocking movement by a cam $a^{12}$, arranged on the driving shaft $a^1$, and engaging a roller $r^{15}$, of the lever arm $r^{13}$. This rocking-movement by the intervention of the lever arms $r^2$, is transmitted to the shaft $r^3$, and gripping fingers $s$, which by means of the gear-wheel $r^4$, and the toothed sector $r^5$, are rotated substantially in a semi-circle and at the same time are oscillated between the feeding mechanism O, and a retaining mechanism T, for the heddles. In addition to the rotary reciprocating movement, a sliding movement is imparted to the gripping fingers $s$, so as to bring the same into engagement with the metal strip $b$, at or before the moment the strip is released by the feeding mechanism O, and cut by the cutting mechanism M, hereinbefore fully described.

The sliding movement of the gripping fingers $s$, is imparted to the same by an arm $r^{16}$, of the shaft $r^3$, being brought into engagement with a bar $r^{17}$, secured at one end to the standard $m$, of the combined cutting and clamping mechanism M, and at its other end to a bracket $r^{18}$, secured to the bed-plate $a$, of the machine. When the arm $r^{16}$, abuts against the bar $r^{17}$, the rotation of the shaft $r^3$, is stopped and as the movement of the lever-arm $r^2$, by means of the cam $a^{12}$, towards the feeding mechanism O, is not yet completed the fingers $s$, which occupy an open position are slid forwards and over the metal strip $b$. At this moment the metal strip $b$, is cut by the cutting mechanism M, and by the upward movement of the slide $m^{12}$, carrying the lower cutting die $m^{18}$, thereof a bracket $m^{36}$, with its bolt $m^{38}$, is brought into engagement with the lower arm of a bell-crank lever $r^{19}$, the upper arm of which engages a slide $r^{20}$, which by means of bolts $r^{21}$, passing through obliquely arranged slots $r^{22}$, of the slide connects the same with the bar $r^{17}$, as shown in Fig. 86. By the upward movement of the slide $m^{12}$, the bell-crank lever $r^{19}$, shifts the slide $r^{20}$, from left to right in Fig. 85, which in turn by means of its slots $r^{22}$, and the bolts $r^{21}$, is shifted from right to left in Fig. 82. This forward movement of the slide $r^{20}$, by means of an adjusting screw $s^2$, is transmitted to a bell-crank lever $s^1$, of each of the oscillating gripping fingers $s$, the hooked end $s^{28}$, of which, by being brought out of engagement with a projection $s^3$, of a finger $s^4$, permits the same to be closed under the influence of a leaf spring $s^5$, secured to the holder $s^6$, in which the finger $s^4$, in the point $s^7$, is pivotally secured as will be readily understood in conjunction with Figs. 77, 78 and 81. The finger $s^4$, at its free end is provided with two hook-like projections $s^8$, and a tongue-like projection $s^9$, the latter of which fits into a slot $s^{11}$, arranged in the second finger $s^{10}$, which is slidably arranged in the holder $s^6$, and held in normal position therein by a spring $s^{12}$, and a bolt $s^{13}$, passing through a slot $s^{15}$, arranged in a plate $s^{14}$, secured to the holder $s^6$, as shown in Fig. 81. When the gripping fingers $s$, are moved toward the metal strip $b$, which is held in position at one end by the feeding mechanism M, the tongue-like projection $s^9$, prevents the metal strip $b$, from being moved too far into the gripping fingers $s$, and by the closing of the finger $s^4$, the strip will be securely held in position therein by the projections $s^8$, coöperating with projections $s^{16}$, formed integral with the finger $s^{10}$, as shown in Figs. 79 and 81. Thus the cut portion of the metal strip now forming a heddle $b^{12}$, which is ready for use, is by means of the projections $s^8$, $s^9$ and $s^{16}$, securely held between the fingers $s^4$ and $s^{10}$, which by the intervention of the cam $a^{12}$, shaft $r^1$ and lever-arm $r^2$, first recede from the feeding mechanism O, by sliding backward on the bar $r^{17}$, and are then turned and moved from the position shown in Figs. 82 and 85, into the position shown in Figs. 75 and 76. This rotary and backward movement of the fingers $s$, is limited by the arm $r^{16}$, abutting against a set-screw $r^{24}$, carried by a bracket $r^{23}$, secured to the bed-plate $a$, of the machine, as shown in Figs. 75, 76 and 83. In this position of the fingers $s$, the heddle $b^{12}$, carried by the same is or preferably has been brought with its end mortises $b^1$, directly into engagement with pointed bars $t$, of a retaining mechanism T, and is thus threaded onto the same.

The retaining bars $t$, by means of clamping fingers $u$, are held during the threading of the heddles $b^{12}$, onto the same in the proper position and also serve to open the gripping fingers $s$, in the following manner: The clamping fingers $u$, consist of two sets of fingers, one set superposed in respect to the other, and pivotally supported in the point $u^1$, to a bracket $u^2$, connected with a bridge-piece $u^3$, supported by shafts $u^4$ and $u^5$, carried by brackets $u^6$, which are connected with the bed-plate $a$, of the machine.

As shown in Figs. 1 and 76, each of the bridge-pieces $u^3$, by means of a bolt $u^8$, is slidably arranged on the shafts $u^4$ and $u^5$, to permit of an adjustment of the clamping fingers $u$, on the same.

As shown in Figs. 75, 85 and 87, the clamping fingers $u$, are arranged a certain distance apart from each other, and are located outside of each of the gripping fingers $s$, so as to hold the retainer bars $t$, sidewise to the gripping fingers $s$, and to permit of the end mortises $b^1$, of the heddle $b^{12}$, being threaded on the retainer bars $t$. Each of the sets of clamping fingers $u$, consists of fingers or jaws $u^9$, normally engaging the retainer bar $t$, from opposite sides under the influence of a spring $u^{10}$, and of arms $u^{11}$, which serve to open the jaws $u^9$, against the tension of the spring $u^{10}$. One of the jaws of each set of upper jaws is provided with a lateral extension $u^{12}$, which when the upper jaws are opened abut against the bolts $s^{13}$, of the lower gripping finger $s^{10}$, and force the same backwards in the holder $s^6$, against the tension of the spring $s^{10}$. By this backward movement of the finger $s^{10}$, the upper finger $s^4$, is simultaneously raised by a lever-arm $s^{18}$, pivotally secured in the point $s^{19}$, to the housing $s^6$, of each of the gripping fingers $s$.

The lever-arm $s^{19}$, is provided with an inclined portion $s^{20}$, engaged by a bolt $s^{21}$, secured to the finger $s^{10}$, and passing through a slot $s^{22}$, arranged in the housing $s^6$.. The movement of the finger $s^{10}$, is thus transmitted to the lever-arm $s^{18}$, which by engaging a lateral projection $s^{23}$, of the finger $s^4$, raises the same against the tension of its spring $s^5$, until its projection $s^3$, is brought into engagement with the hooked end $s^{28}$, of the bell-crank lever $s^1$, which is raised against the tension of a spring $s^{24}$, as shown in Fig. 77. Thus the finger $s^{10}$, is drawn out of the path of the heddle $b^{12}$, and the finger $s^4$, is at the same time raised permitting the heddle $b^{12}$, freed from the fingers to drop onto and slide down the retainer bars $t$, until reaching the gripping jaws $u^9$, of the lower set of jaws $u^9$, which under the influence of their spring $u^{10}$, engages the retainers $t$, and hold the same in proper position during the threading of the heddle thereon, as will be readily understood in conjunction with Figs. 76 and 88. The opening first of the upper jaws and then of the lower jaws $u^9$, of each set of clamping jaws is accomplished by an arm $u^{22}$, secured to the shaft $u^7$, carried by the brackets $u^2$, which arm by means of a bolt $u^{13}$, alternately engages the arms $u^{11}$, of both sets of clamping jaws $u^9$. When the lower jaws $u^9$, are opened, the upper jaws under the influence of their spring are simultaneously brought into engagement with the retaining bars $t$, thus holding the same in position during the time they are released by the lower jaws $u^9$. The heddle resting on the lower jaws $u^9$, will now be released by the same and permitted to drop down on the retainers $t$, of the retaining mechanism T. The arms $u^{11}$, being placed a certain distance away from the jaws $u^9$, are held out of the path of the heddle $b^{12}$, descending on the bars $t$. The shaft $u^7$, and arm $u^{22}$, are actuated by a crank-arm $u^{14}$, connected by links $u^{15}$, and a threaded rod $u^{16}$, with a lever-arm $u^{17}$, pivotally secured in the point $u^{18}$, to the bed-plate $a$, of the machine. The lever-arm $u^{17}$, by means of a roller $u^{19}$, engages a cam $a^{13}$, secured to the driving shaft $a^1$, of the machine, which by means of its throw-portions $a^{14}$, $a^{15}$ and $a^{16}$, bring the bolt $u^{13}$, of the arms $u^{22}$, alternately into engagement with the arms $u^{11}$, of the upper and lower jaws $u^9$, and in a position intermediate thereto, after the actuation of each set of clamping jaws $u^9$, as will be readily understood in conjunction with Figs. 76 and 88, of the drawings. The heddles $b^{12}$, thus delivered to the bars $t$, of the retaining mechanism T, are collected on the same, preferably in two groups so as to permit of the removal of one group thereof, without in the least interfering with the accumulation of heddles in the other group.

As shown in Figs. 89 to 96, inclusive, the retaining mechanism T, preferably consists of a frame formed by horizontal members or bars $t^1$ and $t^2$, carried by vertical members or bars $t^3$. To each end of the bars $t^1$ and $t^2$, are secured standards $t^4$, adapted to permit of the connection of the frame with a floor and with brackets $u^6$, of the clamping fingers $u$, to hold the same in proper position in front of the machine. At their lower end the retainers $t$, are removably held in engagement with their respective bars $t^3$, by a clamping plate $t^5$, and bolts $t^6$, which latter when loosened permit of a turning and thus of a disengagement of the clamping plate $t^5$, from the bars, when it is desired to remove the heddles $b^{12}$, from the same. At their upper end the bars $t$, are engaged and held in position by the clamping jaws $u^9$, in a manner such as hereinbefore fully described, which permits the heddles to slide down on the retainers $t$, one by one, until the same abut against the clamping plates $t^5$, and are then supported by the same. When a required number of heddles $b^{12}$, have been accumulated on the retainers $t$, the same are locked a certain distance from their upper ends, thus preventing the heddles threaded onto the upper ends of the bars $t$, from dropping down onto the heddles which are to be removed from the retainer bars $t$, by the disengagement of the clamping plates $t^5$ therefrom. The heddles $b^{12}$, after the lower end of the bars $t$, have been disengaged may be directly shifted for instance onto the cross-bars of a heddle-frame, not shown, without requiring the stopping or in the least interfering with the proper operation of the machine.

The locking of the retainer bars at their upper portion to permit of the removal of the heddles $b^{12}$, accumulated on the lower portion thereof, is accomplished in the following manner: To the frame-bar $t^1$, and in the point $t^8$, are secured clamping arms $t^7$, which by means of springs $t^9$, are normally held out of engagement with the bars $t$, as shown in Figs. 90 and 92. Between the outer end $t^{10}$, of each of the clamping-arms $t^7$, and the frame bar $t^1$, is arranged a cam disk $t^{12}$, provided with an operating handle $t^{13}$, and a cam portion $t^{14}$. When the cam-portion $t^{14}$, of the disk $t^{12}$, is brought into engagement with the clamping-arm $t^7$, the inner end $t^{11}$, of the same is brought into engagement with the retainer-bar $t$, and forces the same against a projection $t^{15}$, secured to the frame-bar $t^3$. Thus a heddle $b^{12}$, sliding down the retainer-bars $t$, is arrested by the projection $t^{15}$, and supported by the same and serves in turn as a support for heddles, which are threaded onto and slide down the bars $t$.

The strip of metal or wire $b$, from which heddles are to be formed is first conducted by the feeding mechanism O, to the punching mechanism C, and by means of punches $d^1$, carried by adjustable punch-holders $d$, of the said mechanism a heddle is simultaneously punched or pierced at points where the end mortises and eye in a heddle are to be located. Slots $b^1$ and $b^2$, of different lengths are then formed in the strip $b$, which slots are widened by a swaging of the metal at the ends of the slots by means of tools $g^1$ and $g^2$, of the swaging mechanism G, to which the strip is conducted after leaving the punching mechanism C. At the same time the metal of the strip is thus compressed at the point of greatest wear, which is at the end $b^3$, of the slots $b^1$ and $b^2$. The strip $b$, during the punching of the slots therein, and the swaging and spreading of the metal at the ends of the slots, is held in proper positions with respect to the punches $d^1$, and swaging tools $g^1$ and $g^2$, by means of guides, which by being yielding prevent jamming of the strips therein by the portions of greater width, and also insure the piercing of the strip in its longitudinal central axis, irrespective of varying widths thereof. From the swaging mechanism G, the strip $b$, is conducted to the shaping mechanism H, which bends the strip at the longer slotted portion $b^1$, to form offsets $b^4$ and $b^5$ therein, which are designed to hold the heddles apart on the cross-bars of a heddle-frame. The offsets $b^4$ and $b^5$, having been formed, the strip $b$, is conducted to the bending mechanism K, which bends the shanks $b^9$ and $b^{10}$, formed by punching slots $b^2$, therein, in opposite directions to each other, and thus completes the eye, in the strips $b$, this eye in the heddle being adapted to permit of the passage of a thread at right angles to the mortises $b^1$. The said eye being completed in the strip, the same is now conducted to a cutting mechanism M, which cuts the strip intermediate of the two mortises $b^1$. The severed strip now forming a heddle ready for use is engaged before the same is released by the gripping jaws $o^2$, of the feeding mechanism O, by fingers $s^4$ and $s^{10}$, of a gripping mechanism R, and by the same is placed upon retainer bars $t$, of a retaining mechanism T, from which the heddles can be placed directly on the cross-bars of a heddle-frame.

It will be obvious that as to some details changes may be made and still be within the scope of my present invention, and therefore, I do not limit myself to all the detail arrangement of the mechanisms as hereinbefore described and illustrated, but—

Having thus described the nature and objects of my invention what I claim as new and desire to secure by Letters Patent is:—

1. In a machine of the character described, an oscillating gripping and delivering mechanism having holders, two fingers, respectively, slidably and pivotally connected with each of said holders, means for supporting a metal strip in a position opposite said fingers, when occupying a certain position, a shaft having means for rotating the same and carrying the holders, pivotally arranged arms carrying said shaft, means for oscillating said arms, means engaging the rotary means of said shaft to rock the same during the oscillatory movement thereof, and said shaft when rocked adapted to oscillate said holders and by the same said fingers to alternately bring the fingers opposite said carrying means to permit said fingers to remove the metal strip therefrom.

2. In a machine of the character described, an oscillatory gripping and delivering mechanism, having a holder, a finger pivotally connected with the holder, a second finger slidably arranged in the holder and having bolts respectively extending horizontally and vertically therefrom, a lever pivotally connected with the holder and engaging said pivotal finger and having a cam portion engaging the horizontally arranged bolt of said slidable finger, means adapted when engaged by the vertical bolt of the slidable finger in a certain end position of said holder to shift the same, said slidable finger when shifted adapted to actuate said lever and by the same to lift the pivotal finger in said holder, and a second lever carried by said holder and adapted when said pivotal finger is lifted to hold the same in the lifted position.

3. In a machine of the character described, an oscillatory gripping and delivering mechanism having holders, each of said holders having fingers respectively, pivoted and slidably connected with each of said holders and adapted to hold a slotted metal strip between the same, a bell crank-lever resting with one end upon said pivotal finger, carried by each of said holders, bolts connected with the slidable finger of each holder and extending horizontally and vertically therefrom, a lever pivotally connected with each of the holders and engaging said pivotal finger and having a cam portion engaging the horizontally arranged bolt of the slidable finger, stops supporting bars arranged at one side of said holders, said holders adapted to thread by said fingers the metal strip through the slots upon the bars adapted to shift the slidable fingers by bringing the vertically arranged bolts into engagement with said bar-stops, said slidable fingers when shifted adapted to permit the metal strips to descend on said bars and to actuate said cam levers, said cam levers adapted to raise said pivotal fingers, and said bell crank-lever adapted when actuated by said pivotal fingers to hold the same in a raised or open position.

4. In a machine of the character described, an oscillatory gripping and delivering mechanism having holders, each having a finger pivotally connected with a holder and provided with a projection, and a finger slidably arranged in the holder having bolts extending horizontally and vertically therefrom, said fingers adapted to hold a slotted metal strip between the same, a lever having a hook shaped end connected with each of said holders and resting upon the pivotal finger, a second lever pivotally connected with each of said holders engaging said pivotal finger and having a cam portion engaging the horizontally arranged bolt of said slidable finger, stops arranged at each side of said holder, whereof one is provided with bars, means for supporting said holders and for bringing the same alternately into a position to thread the strips upon said bars and to bring successively the vertically arranged bolt of said slidable fingers and the hook shaped lever into engagement with the respective stops, the vertically arranged bolt of the slidable fingers, when actuated by its stop in one of the end positions of said holders adapted to release the metal strip to permit the same to descend on said bars and to actuate said cam levers, said cam levers adapted to raise said pivotal fingers and to bring its hook portion into engagement with the hook shaped end of said lever to hold the same in an open position and permit of the sliding and entrance of a metal strip between said fingers in the second of the end positions of said holders, and said hook shaped lever when contacting with its respective stop in the second of the end positions of said holders adapted to release the pivotal finger to permit of engagement of a metal strip by both fingers.

5. In a machine of the character described, an oscillating gripping and delivering mechanism having gripping fingers, a holder to which said fingers are connected, a shaft carrying the holder and by the same the fingers, arms carrying said shaft, a second shaft carrying said arms, means adapted to impart to said second shaft a rocking movement, a gear-wheel mounted on the first shaft, a sector meshing with the gear-wheel, said gear-wheel and sector adapted when the arms are actuated to impart to the shaft, the holders and the fingers a rocking movement.

6. In a machine of the character described, an oscillating gripping and delivering mechanism having holders, two gripping fingers pivotally and slidable connected with each of the holders, a shaft carrying the holders, arms carrying said shaft, a second shaft carrying said arms, a gear-wheel mounted on the first shaft, a sector meshing with said gear-wheel to rock the first shaft, holders and fingers, yielding means for holding the sector in an operative position and to permit of a certain forward movement of the same by said gear-wheel without rotating said wheel, and said first shaft, when not rotated, adapted to permit of a lateral straight movement of said holders and fingers to shift the same over a metal strip to grip the same.

7. In a machine of the character described, an oscillating gripping and delivering mechanism having a holder, gripping fingers pivotally and slidably connected with said holder, means projecting from said fingers adapted when the same occupy a closed position to hold a metal strip in position between the same, means adapted to shift the slidable fingers out of engagement with the movable fingers and means actuated by said slidable finger adapted when the same is shifted to lift the pivotal finger in the holder to free the metal strip from the fingers.

8. In a machine of the character described, an oscillating gripping and delivering mechanism having a holder, gripping fingers pivotally and slidably connected with the holder, the pivotal fingers having a tongue and projections and the slidable fingers having projections, means adapted to impart to the holder and to said fingers an oscillatory movement, means adapted to hold the pivotal fingers out of engagement with the slidable finger to permit of entrance of a metal strip between the same, means adapted to disengage the holding means from the pivotal finger to permit the same to hold the strip in engagement with the slidable finger, means adapted to shift the slidable finger, means connected with the slidable finger adapted when the same is shifted to actuate the pivotal finger to permit of release of the metal strip by the fingers and the tongue of the slidable finger respectively, adapted to limit the entrance of the metal strip between the fingers and assist in removal therefrom, and the projections of the fingers and tongue of the pivotal finger adapted to hold the strip in position between said fingers during oscillatory movement thereof.

9 In a machine of the character described, an oscillating gripping and delivering mechanism having a holder, a gripping finger slidably arranged in the holder, a second finger pivotally secured to the holder, means carried by the holder engaging the slidable finger and contacting with the pivotal finger, means adapted in one of the end positions of the fingers to shift the slidable finger and by the same and the contacting means to actuate and to open the pivotal finger so as to permit a metal strip held by the fingers to be released therefrom, means connected with the holder and adapted to engage the pivotal finger when actuated and hold the same in a lifted position to permit said finger to be moved over a metal strip, and means adapted to disengage the holding means from said pivotal finger to permit the same to close and hold the metal strip in engagement with said slidable finger.

10. In a machine of the character described, an oscillating gripping and delivering mechanism having holders, gripping fingers secured to each of said holders, a shaft carrying said holders, arms carrying said shaft, means for actuating the fingers arranged at each side of said shaft, means for imparting to said arms and by the same to said holders and fingers oscillatory movement to swing the same between said actuating means, a gear-wheel secured to said shaft, a sector meshing with said gear-wheel, said gear-wheel and sector adapted when said arms are actuated to swing the holders and fingers thereof alternately into a position opposite said actuating means and into engagement therewith, a frame having bars arranged adjacent to said holders and fingers in a certain position of said fingers, and said fingers adapted when rocked and actuated to engage a mortised heddle and thread the same upon said bars.

11. In a machine of the character described, a retaining mechanism having a frame, bars removably secured to said frame, a bracket, two sets of clamping fingers secured to said bracket, each set having actuating arms, means for normally holding said clamping fingers in engagement with the upper end of said bars, a lever arm extending between the actuating means of said two sets of clamping fingers, means for oscillating said lever-arm, and said lever-arm adapted to alternately abut against the actuating arms of each set of clamping fingers to open the same.

In witness whereof, I have hereunto set my signature in the presence of two subscribing witnesses.

WILLIAM FEHR.

Witnesses:
J. WALTER DOUGLASS,
THOMAS M. SMITH.